(12) United States Patent
Tanaka et al.

(10) Patent No.: US 8,271,991 B2
(45) Date of Patent: Sep. 18, 2012

(54) METHOD OF ANALYZING PERFORMANCE IN A STORAGE SYSTEM

(75) Inventors: Toru Tanaka, Kawasaki (JP); Yuichi Taguchi, Sagamihara (JP); Jun Mizuno, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1291 days.

(21) Appl. No.: 11/970,004

(22) Filed: Jan. 7, 2008

(65) Prior Publication Data

US 2008/0216086 A1 Sep. 4, 2008

(30) Foreign Application Priority Data

Mar. 1, 2007 (JP) ................................. 2007-051469

(51) Int. Cl.
*G06F 9/46* (2006.01)
*G06F 13/00* (2006.01)

(52) U.S. Cl. ........ 718/105; 718/104; 711/112; 711/114; 711/165

(58) Field of Classification Search .................. None
See application file for complete search history.

(56) References Cited

U.S. PATENT DOCUMENTS

| 2001/0054133 A1 | 12/2001 | Murotani et al. | |
|---|---|---|---|
| 2003/0221063 A1* | 11/2003 | Eguchi et al. | 711/114 |
| 2005/0108475 A1* | 5/2005 | Yamamoto | 711/114 |
| 2007/0130423 A1* | 6/2007 | Liu et al. | 711/114 |
| 2007/0143542 A1* | 6/2007 | Watanabe et al. | 711/114 |

FOREIGN PATENT DOCUMENTS

JP 2001337790 A 12/2001

* cited by examiner

*Primary Examiner* — Emerson Puente
*Assistant Examiner* — Adam Lee
(74) *Attorney, Agent, or Firm* — Sughrue Mion, PLLC

(57) ABSTRACT

A method of balancing a load in a computer system having at least one storage system, and a management computer, each of the storage systems having physical disks and a disk controller, the load balancing method including the steps of: setting at least one of the physical disks as a parity group; providing a storage area of the set parity group as at least one logical volumes to the host computer; calculating a logical volume migration time when a utilization ratio of the parity group becomes equal to or larger than a threshold; and choosing, as a data migration source volume, one of the logical volumes included in the parity group that has the utilization ratio equal to or larger than the threshold, by referring to the calculated logical volume migration time, the data migration source volume being the logical volume from which data migrates.

14 Claims, 21 Drawing Sheets

| 8001 | 8002 | 8003 |
|---|---|---|
| HOST NAME | USED LUN | CONNECTED IF NAME |
| HOST A | LU1 | IF1 |
| HOST A | LU2 | IF1 |
| HOST A | LU3 | IF1 |
| HOST A | LU4 | IF1 |

2003
HOST SETTINGS TABLE

*FIG. 5*

| 15001 | 15002 | 15003 | 15004 |
|---|---|---|---|
| STORAGE DEVICE NAME | PG NAME | PG UTILIZATION RATIO THRESHOLD | OVER-THRESHOLD UTILIZATION FLAG |
| STORAGE DEVICE A | PG1 | 40% | ON |

7003
THRESHOLD SETTINGS TABLE

*FIG. 6*

| MIGRATION SOURCE CANDIDATE LUN | ONLINE MIGRATION TIME | POST-MIGRATION PG UTILIZATION RATIO | POST-MIGRATION PERFORMANCE EVALUATION | MIGRATION FLAG |
|---|---|---|---|---|
| LU1 | 307 MINUTES | 31 % | OK | OFF |
| LU2 | 136 MINUTES | 40 % | NG | OFF |
| LU3 | 70 MINUTES | 39 % | OK | OFF |
| LU4 | 47 MINUTES | 37 % | OK | ON |
| LU1,LU2 | 443 MINUTES | 22 % | OK | OFF |
| LU1,LU3 | 377 MINUTES | 21 % | OK | OFF |
| LU1,LU4 | 354 MINUTES | 19 % | OK | OFF |
| LU2,LU3 | 206 MINUTES | 31 % | OK | OFF |
| LU2,LU4 | 183 MINUTES | 29 % | OK | OFF |
| LU3,LU4 | 117 MINUTES | 27 % | OK | OFF |
| : | : | : | : | : |
| LU1,LU2,LU3,LU4 | 560 MINUTES | 0 % | OK | OFF |

MIGRATION SOURCE CANDIDATE LU TABLE

FIG. 7

5004 STORAGE SYSTEM SETTINGS TABLE

5005 STORAGE SYSTEM PERFORMANCE INFORMATION TABLE

| 8001 | 8002 | 8003 | 8004 |
|---|---|---|---|
| HOST NAME | USED LUN | CONNECTED IF NAME | ONLINE MIGRATION FLAG |
| HOST A | LU 2 | IF 1 | UNNECESSARY |

2003
HOST SETTINGS TABLE

FIG. 17

| MIGRATION SOURCE CANDIDATE LUN | OFFLINE MIGRATION TIME | ONLINE MIGRATION TIME | MIGRATION TIME | POST-MIGRATION PG UTILIZATION RATIO | POST-MIGRATION PERFORMANCE EVALUATION | MIGRATION FLAG |
|---|---|---|---|---|---|---|
| 16001 | 16006 | 16002 | 16007 | 16003 | 16004 | 16005 |
| LU1 | — | 307 MINUTES | 307 MINUTES | 31 % | OK | OFF |
| LU2 | 68 MINUTES | — | 68 MINUTES | 40 % | NG | OFF |
| LU3 | 27 MINUTES | — | 27 MINUTES | 39 % | OK | ON |
| LU4 | — | 47 MINUTES | 47 MINUTES | 37 % | OK | OFF |
| LU1,LU2 | — | — | 375 MINUTES | 22 % | OK | OFF |
| LU1,LU3 | — | — | 334 MINUTES | 21 % | OK | OFF |
| LU1,LU4 | — | — | 354 MINUTES | 19 % | OK | OFF |
| LU2,LU3 | — | — | 95 MINUTES | 31 % | OK | OFF |
| LU2,LU4 | — | — | 115 MINUTES | 29 % | OK | OFF |
| LU3,LU4 | — | — | 74 MINUTES | 27 % | OK | OFF |
| : | : | : | : | : | : | : |
| LU1,LU2,LU3,LU4 | — | — | 449 MINUTES | 0 % | OK | OFF |

7004
MIGRATION SOURCE CANDIDATE LU TABLE

FIG. 18

|       11001        | 11002   | 11003 | 11004    | 11005     | 11006      |
| ------------------ | ------- | ----- | -------- | --------- | ---------- |
| STORAGE DEVICE NAME | PG NAME | LUN   | CAPACITY | COPY RATE | PAIRED LUN |
| STORAGE DEVICE A   | PG 1    | LU 1  | 300 GB   | 50 MB/s   |            |
| STORAGE DEVICE A   | PG 1    | LU 2  | 200 GB   | 50 MB/s   |            |
| STORAGE DEVICE A   | PG 1    | LU 3  | 80 GB    | 50 MB/s   |            |
| STORAGE DEVICE A   | PG 1    | LU 4  | 100 GB   | 50 MB/s   | LU 15      |

5004
STORAGE SYSTEM SETTINGS TABLE

*FIG. 19*

| MIGRATION SOURCE CANDIDATE LUN (16001) | MIGRATION DESTINATION PG (16008) | ONLINE MIGRATION TIME (16002) | POST-MIGRATION PG UTILIZATION RATIO (16003) | POST-MIGRATION PERFORMANCE EVALUATION (16004) | MIGRATION FLAG (16005) |
|---|---|---|---|---|---|
| LU1 | PG2 | 307 MINUTES | 31% | OK | OFF |
| LU2 | PG2,PG3 | 136 MINUTES | 40% | NG | OFF |
| LU3 | PG3 | 70 MINUTES | 39% | OK | OFF |
| LU4 | PG3 | 47 MINUTES | 37% | OK | ON |
| LU1,LU2 | | 443 MINUTES | 22% | OK | OFF |
| LU1,LU3 | | 377 MINUTES | 21% | OK | OFF |
| LU1,LU4 | | 354 MINUTES | 19% | OK | OFF |
| LU2,LU3 | PG3 | 206 MINUTES | 31% | OK | OFF |
| LU2,LU4 | | 183 MINUTES | 29% | OK | OFF |
| LU3,LU4 | | 117 MINUTES | 27% | OK | OFF |
| : | : | : | : | : | : |
| LU1,LU2,LU3,LU4 | | 560 MINUTES | 0% | OK | OFF |

7004

MIGRATION SOURCE CANDIDATE LU TABLE

*FIG. 23*

METHOD OF ANALYZING PERFORMANCE IN A STORAGE SYSTEM

CLAIM OF PRIORITY

The present application claims priority from Japanese patent application P2007-51469 filed on Mar. 1, 2007, the content of which is hereby incorporated by reference into this application.

BACKGROUND

This invention relates to a computer system having a storage system and a management computer, and more particularly, to a technique of balancing a load of a parity group.

A recent improvement in host computer performance and transmission speed of Internet lines has caused an increase in an amount of data handled by a host computer, which in turn increases access to a storage system where data is stored.

In most cases, logical volumes in a storage system are accessed unevenly and the load of a parity group is accordingly unbalanced. As a solution to the unbalanced load of a parity group, a migration technique is known which moves a logical volume from one storage system to another.

JP 2001-337790 A discloses a technique in which a data migration instruction is issued when a utilization ratio of a logical volume in a storage system exceeds a threshold, thereby moving data out of this logical volume and balancing the load of a parity group.

SUMMARY

However, the technique of JP 2001-337790 A determines which logical volume needs data migration based only on the parity group utilization ratio. This is problematic since a logical volume that take a long time to migrate is determined as a logical volume that needs data migration, and the prolonged migration causes a delay in returning the utilization ratio of the parity group to its normal value.

This invention has been made in view of the above-mentioned problem, and it is therefore an object of this invention to provide a technique of reducing a time required to return a utilization ratio of a parity group to a normal value.

According to an exemplary embodiment of this invention, there is provided a method of balancing a load in a computer system having at least one storage system coupled to a host computer, and a management computer coupled to the host computer and the storage system, each of the storage systems having physical disks, which store data requested by the host computer to be written, and a disk controller, which controls the physical disks, the load balancing method comprising the steps of: setting, by the disk controller, at least one of the physical disks as a parity group, which is a single virtual disk; providing, by the disk controller, a storage area of the set parity group as at least one logical volume to the host computer; calculating, by the management computer, a logical volume migration time in a case where a utilization ratio of the parity group becomes equal to or larger than a threshold, the logical volume migration time being a time required to move data from one logical volume in one parity group to another parity group; and choosing, by the management computer, as a data migration source volume, one of the logical volumes included in the parity group that has the utilization ratio equal to or larger than the threshold, by referring to the calculated logical volume migration time, the data migration source volume being the logical volume from which data migrates.

According to the representative mode of this invention, the utilization ratio of a parity group can be returned to a normal value in less time.

BRIEF DESCRIPTION OF THE DRAWINGS

The present invention can be appreciated by the description which follows in conjunction with the following figures, wherein:

FIG. 5 is a configuration diagram of the host settings table that is stored in the memory of the host computer according to the first embodiment of this invention;

FIG. 6 is a configuration diagram of the threshold settings table which is stored in the memory of the management host computer according to the first embodiment of this invention;

FIG. 7 is a configuration diagram of the migration source candidate LU table that is stored in the memory of the management host computer according to the first embodiment of this invention;

FIG. 17 is a configuration diagram of the host settings table that is stored in the memory of the host computer according to the second embodiment of this invention;

FIG. 18 is a configuration diagram of the migration source candidate LU table that is stored in the memory of the management host computer according to the second embodiment of this invention;

FIG. 19 is a configuration diagram of the storage system settings table that is stored in the memory of each storage system according to the second embodiment of this invention;

FIG. 23 is a configuration diagram of the migration source candidate LU table that is stored in the memory of the management host computer according to the third embodiment of this invention;

DETAILED DESCRIPTION OF THE PREFERRED EMBODIMENTS

Embodiments of this invention will be described below with reference to the accompanying drawings.

First Embodiment

Figure 1:
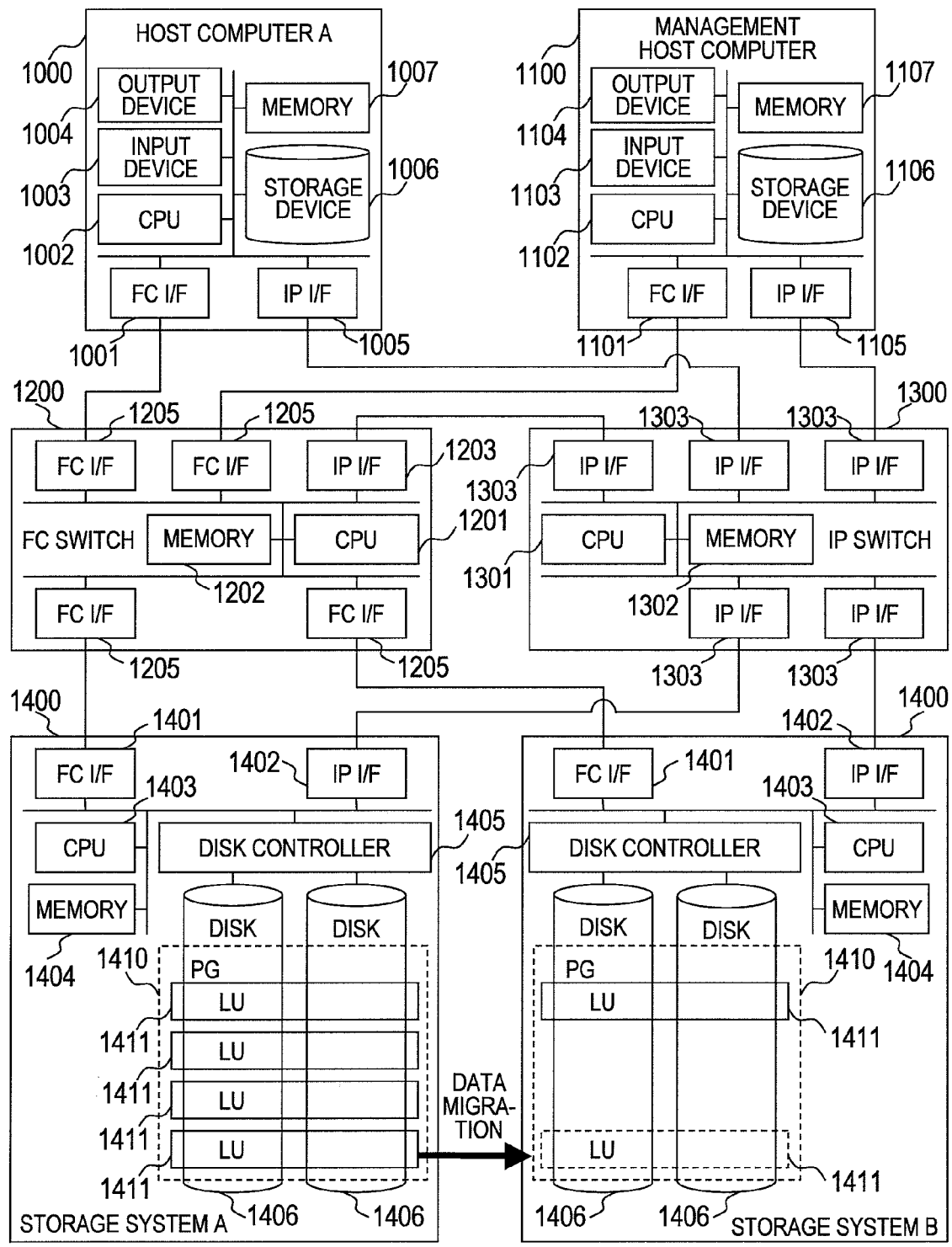
FIG. 1 is a block diagram showing the configuration of a computer system according to a first embodiment of this invention.

FIG. 1 is a block diagram showing the configuration of a computer system according to a first embodiment of this invention.

The computer system has a host computer 1000, a management host computer 1100, an FC switch 1200, an IP switch 1300, and a storage system 1400.

FIG. 1 shows one host computer 1000, FC switch 1200, and IP switch 1300, but the computer system can have as many of those components as necessary. Similarly, the computer system may have more or less than two storage systems 1400 which are shown in FIG. 1.

The host computer 1000 requests the storage system 1400 to write and read data. The host computer 1000 has an FC I/F 1001, a CPU 1002, an input device 1003, an output device 1004, an IP I/F 1005, a storage device 1006, and a memory 1007.

The FC I/F 1001 is an interface that is connected to the storage systems 1400 via the FC switch 1200. The IP I/F 1005 is an interface that is connected to the management host computer 1100 via the IP switch 1300.

The CPU 1002 performs various processes by executing a program stored in the memory 1007. The memory 1007 stores a program executed by the CPU 1002, information needed by the CPU 1002, and the like. Details of the memory 1007 will be described with reference to FIG. 2.

The storage device 1006 stores various types of information including programs. The input device 1003 receives inputs of various types of information. The input device 1003 is, for example, a keyboard or a mouse. The output device 1004 outputs various types of information. The output device 1004 is, for example, a display.

The management host computer 1100 handles the overall management of the computer system. The management host computer 1100 has an FC I/F 1101, a CPU 1102, an input device 1103, an output device 1104, an IP I/F 1105, a storage device 1106, and a memory 1107.

The FC I/F 1101 is an interface that is connected to the storage systems 1400 via the FC switch 1200. The IP I/F 1105 is an interface that is connected to the host computer 1000 via the IP switch 1300.

The CPU 1102 performs various processes by executing a program stored in the memory 1107. The memory 1107 stores a program executed by the CPU 1102, information needed by the CPU 1102, and the like. Details of the memory 1107 will be described with reference to FIG. 3.

The storage device 1106 stores various types of information including programs. The input device 1103 receives inputs of various types of information. The input device 1103 is, for example, a keyboard or a mouse. The output device 1104 outputs various types of information. The output device 1104 is, for example, a display.

The FC switch 1200 transfers data that is exchanged between the host computer 1000 and the storage systems 1400, data that is exchanged between the storage systems 1400, and data that is exchanged between the management host computer 1100 and the storage systems 1400. For instance, the FC switch 1200 transfers write requests, write data, read requests, and read data.

The FC switch 1200 has a CPU 1201, a memory 1202, an IP I/F 1203, and FC I/Fs 1205.

The IP I/F 1203 is an interface that is connected to the management host computer 1100 via a local area network (LAN) or the like. The FC I/Fs 1205 are interfaces each of which is connected via a fibre channel (FC) to the host computer 1000, the management host computer 1100, or one of the storage systems 1400.

The CPU 1201 performs various processes by executing a program stored in the memory 1202. For instance, the CPU 1201 controls the overall process of the FC switch 1200.

The memory 1202 stores a program executed by the CPU 1201, information needed by the CPU 1201, and the like. For instance, the memory 1202 stores a routing table and a routing program. The routing program transfers received data based on the routing table.

The IP switch 1300 transfers data that is exchanged between the host computer 1000 and the management host computer 1100, and data that is exchanged between the management host computer 1100 and the storage systems 1400. For instance, the IP switch transfers management information.

The IP switch 1300 has a CPU 1301, a memory 1302, and IP I/Fs 1303.

The IP I/F 1303 are interfaces each of which is connected via a LAN or the like to the host computer 1000, the management host computer 1100, or one of the storage systems 1400.

The CPU 1301 performs various processes by executing a program stored in the memory 1302. For instance, the CPU 1301 controls the overall process of the IP switch 1300.

The memory 1302 stores a program executed by the CPU 1301, information needed by the CPU 1301, and the like. For instance, the memory 1302 stores a routing table and a routing program. The routing program transfers received data based on the routing table.

Each storage system 1400 has an FC I/F 1401, an IP I/F 1402, a CPU 1403, a memory 1404, a disk controller 1405, and disk drives 1406.

The FC I/F 1401 is an interface that is connected via the FC switch 1200 to the host computer 1000, the management host computer 1100, or the other storage system 1400. The IP I/F 1402 is an interface that is connected to the management host computer 1100 via the IP switch 1300.

The CPU 1403 performs various processes by executing a program stored in the memory 1404. For instance, the CPU 1403 controls the overall process of its storage system 1400.

The memory 1404 stores a program executed by the CPU 1403, information needed by the CPU 1403, and the like. Details of the memory 1404 will be described with reference to FIG. 4.

The disk drives 1406 store data that is requested by the host computer 1000 to be written. The disk controller 1405 controls data input and output to and from the disk drives 1406.

The disk controller 1405 gives the disk drives 1406 a redundant array of independent disks (RAID) architecture which is a redundant configuration. The disk controller 1405 treats one disk drive 1406 or a group of disk drives 1406 as a virtual disk (a parity group 1410).

Each parity group 1410 is divided by the disk controller 1405 into one or more logical volumes (LUs) 1411, which are provided to the host computer 1000 and the management host computer 1100. The host computer 1000 and the management host computer 1100 thus recognize storage areas of the disk drives 1406 in the storage system 1400 as the LUs 1411.

Figure 2:
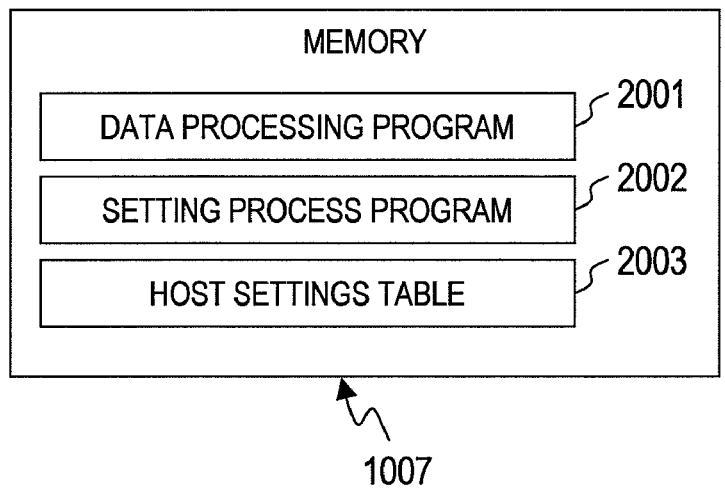
FIG. 2 is a block diagram showing the configuration of the memory in the host computer according to the first embodiment of this invention.

FIG. 2 is a block diagram showing the configuration of the memory 1007 in the host computer 1000 according to the first embodiment of this invention.

The memory 1007 in the host computer 1000 stores a data processing program 2001, a setting process program 2002, and a host settings table 2003.

The data processing program 2001 reads/writes data from/to the storage systems 1400. The setting process program 2002 creates and updates the host settings table 2003.

The host settings table 2003 shows information about the settings of the host computer 1000. Details of the host settings table 2003 will be described with reference to FIG. 5.

Figure 3:
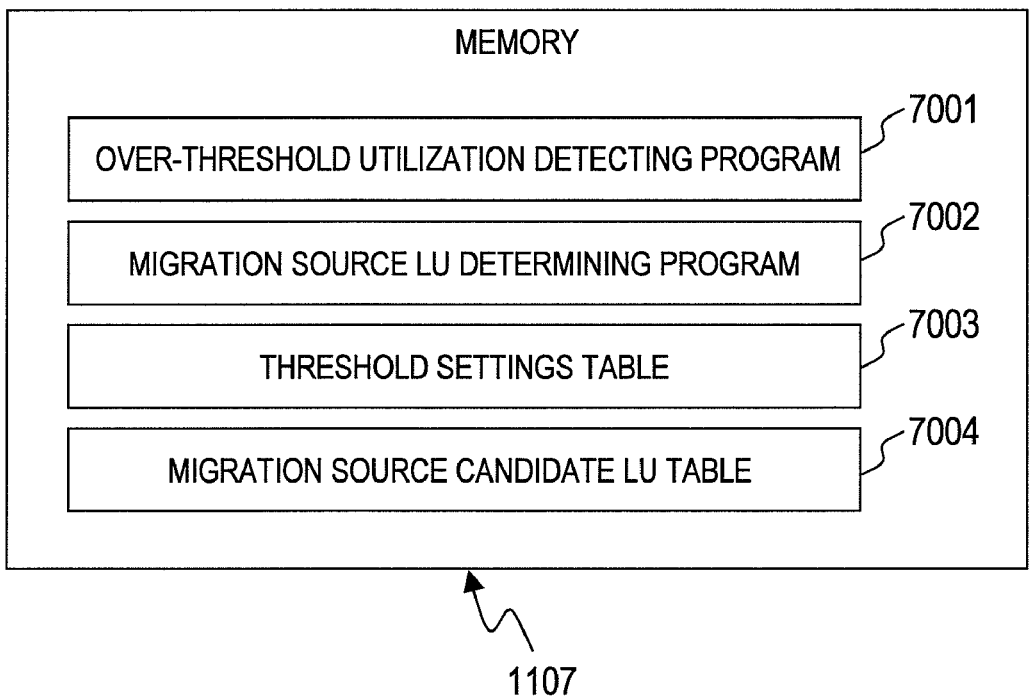
FIG. 3 is a block diagram showing the configuration of the memory in the management host computer according to the first embodiment of this invention.

FIG. 3 is a block diagram showing the configuration of the memory 1107 in the management host computer 1100 according to the first embodiment of this invention.

The memory 1107 in the management host computer 1100 stores an over-threshold utilization detecting program 7001, a migration source LU determining program 7002, a threshold settings table 7003, and a migration source candidate LU table 7004.

The over-threshold utilization detecting program 7001 judges whether or not the utilization ratio of the parity group 1410 is equal to or higher than a threshold. The process executed by the over-threshold utilization detecting program 7001 will be described in detail with reference to FIG. 11.

The migration source LU determining program 7002 determines which LU 1411 is to migrate. The process executed by the migration source LU determining program 7002 will be described in detail with reference to FIG. 12.

The threshold settings table 7003 shows a threshold for the utilization ratio of the parity group 1410. Details of the threshold settings table 7003 will be described with reference to FIG. 6.

The migration source candidate LU table 7004 shows information about the LU 1411 that is a migration source candidate. Details of the migration source candidate LU table 7004 will be described with reference to FIG. 7.

Figure 4:
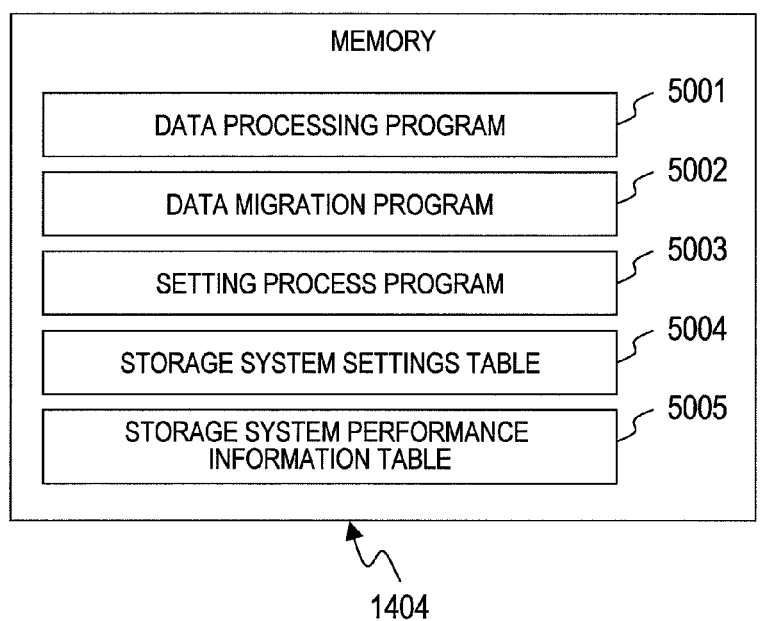
FIG. 4 is a block diagram showing the configuration of the memory in the storage system according to the first embodiment of this invention.

FIG. 4 is a block diagram showing the configuration of the memory 1404 in the storage system 1400 according to the first embodiment of this invention.

The memory 1404 in the storage system 1400 stores a data processing program 5001, a data migration program 5002, a setting process program 5003, a storage system settings table 5004, and a storage system performance information table 5005.

The data processing program 5001 receives a read request from the host computer 1000 and reads data requested to be read out of one of the LUs 1411. The data processing program 5001 sends the read data to the host computer 1000. Also, the data processing program 5001 receives a write request from the host computer 1000 and writes data requested to be written in one of the LUs 1411.

The data migration program 5002 performs migration in which data is moved from one LU 1411 belonging to one parity group 1410 to another parity group 1410 (the migration destination parity group 1410). In this embodiment, which parity group 1410 serves as the migration destination parity group 1410 is set in advance. The migration destination parity group 1410 and the parity group 1410 to which the LU 1411 that is to migrate belongs (the migration source parity group 1410) may be built in the same storage system 1400, or in different storage systems 1400.

The setting process program 5003 creates and updates the storage system settings table 5004.

The storage system settings table 5004 shows information about settings of its storage system 1400. Details of the storage system settings table 5004 will be described with reference to FIG. 8.

The storage system performance information table 5005 shows information about the current performance of its storage system 1400. Details of the storage system performance information table 5005 will be described with reference to FIG. 9.

FIG. 5 is a configuration diagram of the host settings table 2003 that is stored in the memory 1007 of the host computer 1000 according to the first embodiment of this invention.

The host settings table 2003 contains a host name 8001, a used LUN 8002, and a connected IF name 8003.

The host name 8001 indicates an identifier unique to the host computer 1000. The used LUN 8002 indicates an identifier unique to the LU 1411 that can be accessed from the host computer 1000 identified by the host name 8001 of a record entry in question.

The connected IF name 8003 indicates an identifier unique to the FC I/F 1401 that is used by the host computer 1000 identified by the host name 8001 of a record entry in question to access the LU 1411 that is identified by the used LUN 8002 of the record.

FIG. 6 is a configuration diagram of the threshold settings table 7003 which is stored in the memory 1107 of the management host computer 1100 according to the first embodiment of this invention.

The threshold settings table 7003 contains a storage name 15001, a PG name 15002, a PG utilization ratio threshold 15003, and an over-threshold utilization flag 15004.

The storage name 15001 indicates an identifier unique to each storage system 1400. The PG name 15002 indicates an identifier unique to the parity group 1410 built in the storage system 1400 that is identified by the storage name 15001 of a record entry in question.

The PG utilization ratio threshold 15003 indicates a threshold for the utilization ratio of the parity group 1410 that is identified by the PG name 15002 of a record entry in question.

The over-threshold utilization flag 15004 indicates whether or not the utilization ratio of the parity group 1410 that is identified by the PG name 15002 of a record entry in question is equal to or higher than the PG utilization ratio threshold 15003 of the record. In this embodiment, "ON" is stored as the over-threshold utilization flag 15004 when the utilization ratio of the parity group 1410 that is identified by the PG name 15002 of a record entry in question is equal to or higher than the PG utilization threshold 15003 of the record.

When the utilization ratio of the parity group 1410 that is identified by the PG name 15002 of a record entry in question is lower than the PG utilization threshold 15003 of the record, "OFF" is stored as the over-threshold utilization flag 15004.

FIG. 7 is a configuration diagram of the migration source candidate LU table 7004 that is stored in the memory 1107 of the management host computer 1100 according to the first embodiment of this invention.

The migration source candidate LU table 7004 contains a migration source candidate LUN 16001, an online migration time 16002, a post-migration PG utilization ratio 16003, a post-migration performance evaluation 16004, and a migration flag 16005.

The migration source candidate LUN 16001 indicates an identifier unique to the LU 1411 that is a migration source candidate. A cell for the migration source candidate LUN 16001 may hold the identifier of one LU 1411 or the identifiers of a plurality of LUs 1411. When the identifiers of the plurality of LUs 1411 are held in a cell for the migration source candidate LUN 16001, it means that data is to migrate from every one of those LUs 1411.

The online migration time 16002 indicates a time necessary for data to migrate online from the LU 1411 that is identified by the migration source candidate LUN 16001 of a record in question.

Online data migration is data migration that is executed while access from the host computer 1000 to the LU 1411 in question is maintained. Offline data migration is data migration that is executed while access from the host computer 1000 to the LU 1411 in question is suspended.

The post-migration PG utilization ratio 16003 indicates a predicted utilization ratio of the migration source parity group 1410 after data migration from the LU 1411 that is identified by the migration source candidate LUN 16001 of a record entry in question is completed.

The post-migration performance evaluation 16004 indicates whether or not the post-PG utilization ratio 16003 of a record entry in question is lower than the PG utilization threshold 15003 of the threshold settings table 7003. In this embodiment, "OK" is stored as the post-migration performance evaluation 16004 when the post-migration utilization ratio 16003 of a record entry in question is lower than the PG utilization threshold 15003 of the threshold settings table 7003. When the post-migration utilization ratio 16003 of a record entry in question is equal to or higher than the PG utilization threshold 15003 of the threshold settings table 7003, "NG" is stored as the post-migration performance evaluation 16004.

The migration flag 16005 indicates whether or not the LU 1411 that is identified by the migration source candidate LUN 16001 of a record entry in question is determined as a migration source. In this embodiment, "ON" is stored as the migration flag 16005 when the LU 1411 that is identified by the migration source candidate LUN 16001 of a record entry in question is determined as a migration source. When the LU 1411 that is identified by the migration source candidate LUN 16001 of a record entry in question is not determined as a migration source, "OFF" is stored as the migration flag 16005.

Figure 8:
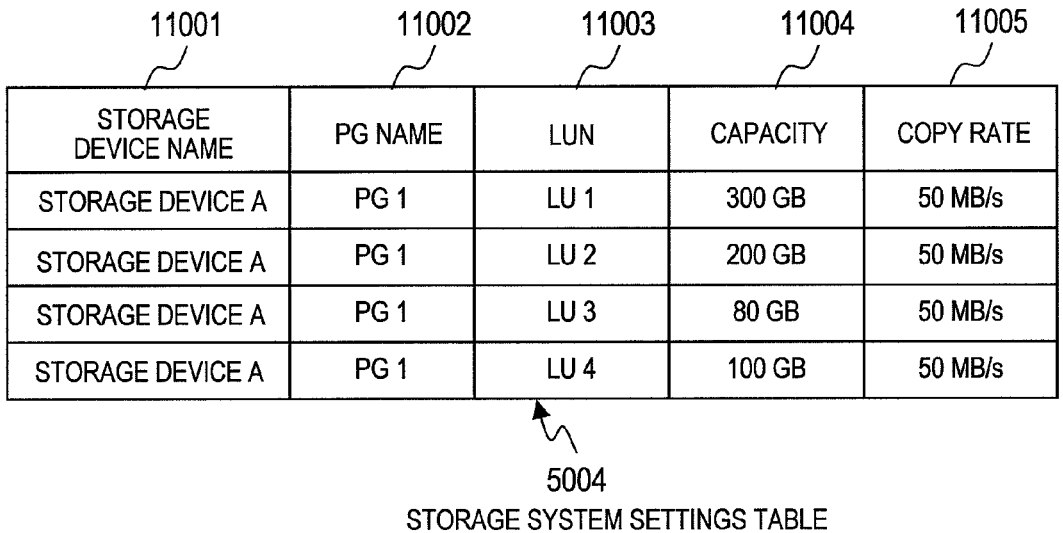
FIG. 8 is a configuration diagram of the storage system settings table that is stored in the memory of each storage system according to the first embodiment of this invention.

FIG. 8 is a configuration diagram of the storage system settings table 5004 that is stored in the memory 1404 of each storage system 1400 according to the first embodiment of this invention.

The storage system settings table 5004 contains a storage name 11001, a PG name 11002, an LUN 11003, a capacity 11004, and a copy rate 11005.

The storage name 11001 indicates an identifier unique to each storage system 1400. The PG name 11002 indicates an identifier unique to the parity group 1410 built in the storage system 1400 that is identified by the storage name 11001 of a record entry in question. The LUN 11003 indicates an identifier unique to the LU 1411 that belongs to the parity group 1410 identified by the PG name 11002 of a record entry in question.

The capacity 11004 indicates the capacity of the LU 1411 that is identified by the LUN 11003 of a record entry in question. The copy rate 11005 indicates the amount of data copied per unit time in migration of data from the LU 1411 that is identified by the LUN 11003 of a record entry in question to the parity group 1410 that is not the one to which this LU 1411 belongs.

Figure 9:
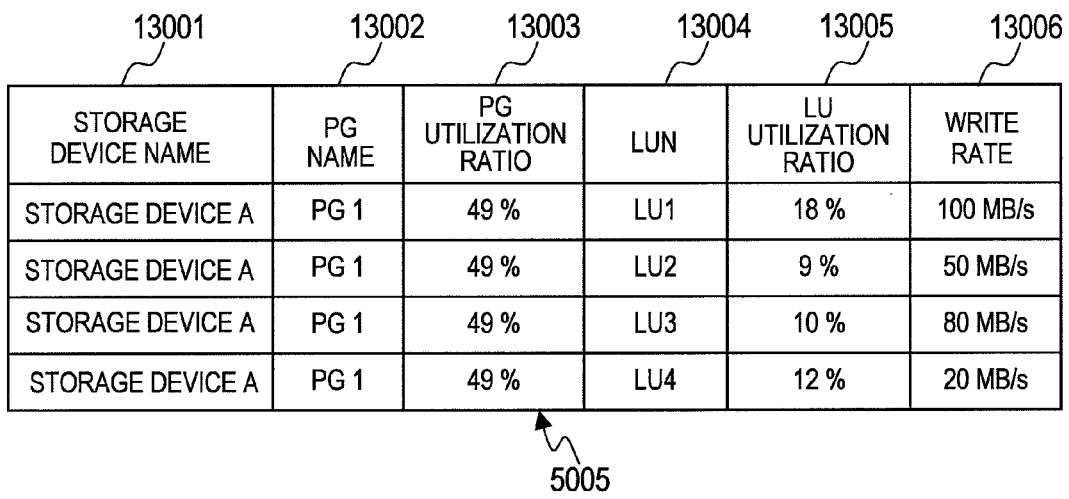
FIG. 9 is a configuration diagram of the storage system performance information table which is stored in the memory of each storage system according to the first embodiment of this invention.

FIG. 9 is a configuration diagram of the storage system performance information table 5005 which is stored in the memory 1404 of each storage system 1400 according to the first embodiment of this invention.

The storage system performance information table 5005 contains a storage name 13001, a PG name 13002, a PG utilization ratio 13003, an LUN 13004, an LU utilization ratio 13005, and a write rate 13006.

The storage name 13001 indicates an identifier unique to each storage system 1400. The PG name 13002 indicates an identifier unique to the parity group 1410 built in the storage system 1400 that is identified by the storage name 13001 of a record entry in question.

The PG utilization ratio 13003 indicates the utilization ratio of the parity group 1410 that is identified by the PG name 13002 of a record entry in question. The utilization ratio of each parity group 1410 is the ratio of the length of time during which access to the parity group 1410 keeps the disk drives 1406 operating to a given period of time.

The LUN 13004 indicates an identifier unique to the LU 1411 that belongs to the parity group 1410 identified by the PG name 13002 of a record entry in question.

The LU utilization ratio 13005 indicates the utilization ratio of the LU 1411 that is identified by the LUN 13004 of a record entry in question. The utilization ratio of each LU 1411 is the ratio of the length of time during which access to the LU 1411 keeps the disk drives 1406 operating to a given period of time. Accordingly, the utilization ratio of each parity group 1410 equals to the sum of the utilization ratios of all the LUs 1411 that belong to the parity group 1410.

The write rate 13006 indicates the amount of data written per unit time in the LU 1411 that is identified by the LUN 13004 of a record entry in question.

Figure 10:
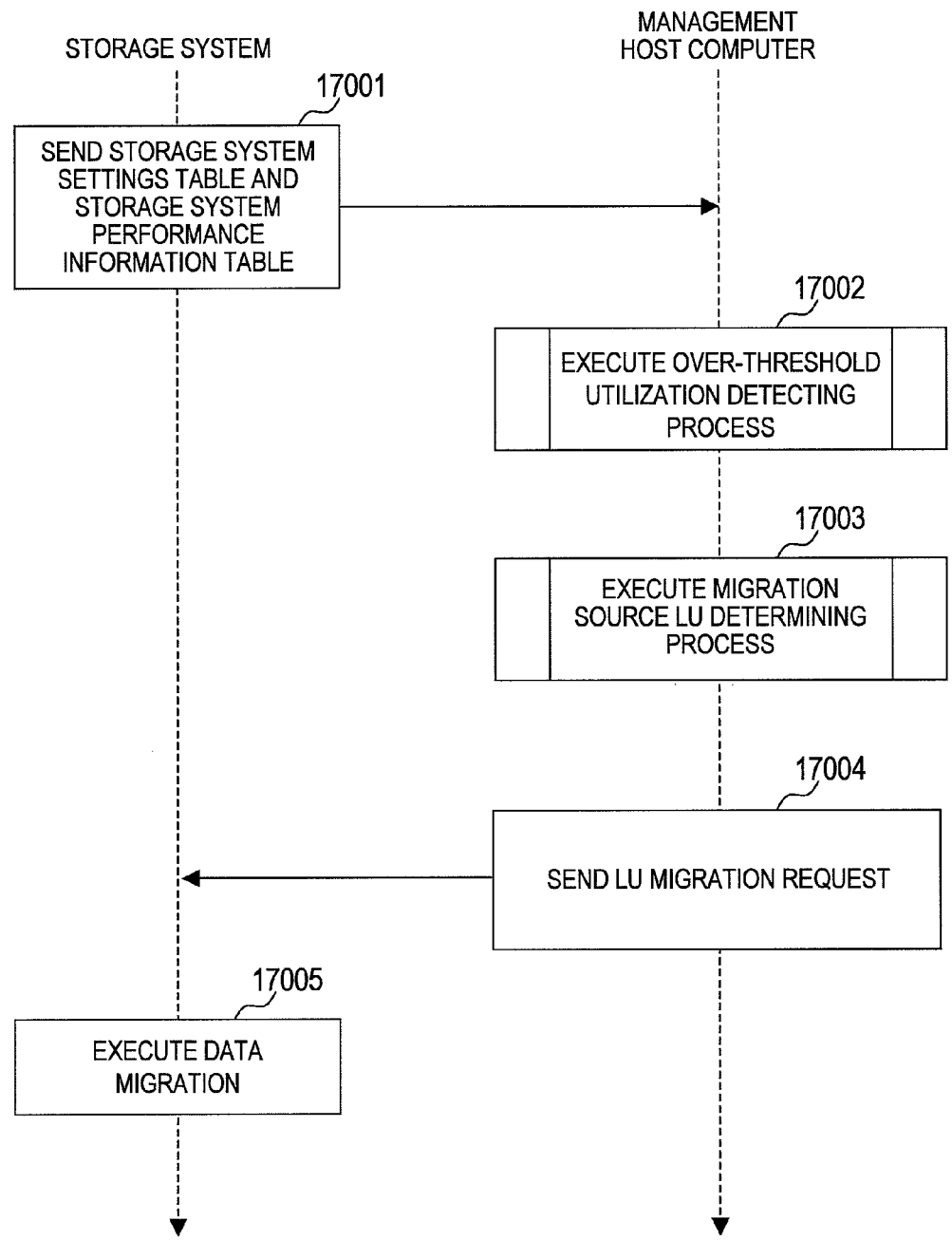
FIG. 10 is a sequence diagram of a performance tuning process for the computer system according to the first embodiment of this invention.

FIG. 10 is a sequence diagram of a performance tuning process for the computer system according to the first embodiment of this invention.

This sequence diagram illustrates a case in which the utilization ratio of one parity group 1410 exceeds a threshold.

The CPU 1403 in each storage system 1400 measures the performance of its storage system 1400 and collection of the performance information is timed with a given event. The performance information contains the utilization ratio of the parity group 1410, the utilization ratios of the LUs 1411, and a write rate at which data is written in the LUs 1411. The CPU 1403 in the storage system 1400 stores the collected performance information in the storage system performance information table 5005.

Next, the CPU 1403 in the storage system 1400 sends the storage system settings table 5004 and the storage system performance information table 5005 to the management host computer 1100 (17001).

The CPU 1102 in the management host computer 1100 receives the storage system settings table 5004 and the storage system performance information table 5005 from the storage system 1400. The CPU 1102 in the management host computer 1100 then executes an over-threshold utilization detecting process (17002). Details of the over-threshold utilization detecting process will be described with reference to FIG. 11.

The CPU 1102 in the management host computer 1100 executes a migration source LU determining process (17003). Details of the migration source LU determining process will be described with reference to FIG. 12.

The CPU 1102 in the management host computer 1100 next selects a record entry of the migration source candidate LU table 7004 that has "ON" as the migration flag 16005. From the selected record, the CPU 1102 in the management host computer 1100 extracts the migration source candidate LUN 16001.

The CPU 1102 in the management host computer 1100 sends an LU migration request to the storage system 1400 (17004). The LU migration request requests migration of the LU 1411 that is identified by the extracted migration source candidate LUN 16001.

The CPU 1403 in the storage system 1400 receives the LU migration request from the management host computer 1100. Receiving the request, the CPU 1403 in the storage system 1400 performs migration that moves data from the migration source LU 1411 belonging to one parity group 1410 to the other parity group 1410 (17005). This creates a new LU 1411 (migration destination LU 1411) in the migration destination parity group 1410.

After data migration of the LU 1411 is completed, the CPU 1403 in the storage system 1400 updates the storage system settings table 5004 and the storage system performance information table 5005.

Specifically, the CPU 1403 in the storage system 1400 deletes from the storage system settings table 5004 a record entry whose LUN 11003 matches the identifier of the migration source LU 1411. The CPU 1403 in the storage system 1400 then deletes from the storage system performance information table 5005 a record entry whose LUN 13004 matches the identifier of the migration source LU 1411.

The CPU 1403 in the storage system 1400 also instructs the host computer 1000 that has access to the migration source LU 1411 to switch paths. Receiving the path switching instruction, the CPU 1002 in the host computer 1000 updates the host settings table 2003.

The CPU 1403 in the storage system 1400 that provides the migration destination LU 1411 (the migration destination storage system 1400), too, updates the storage system settings table 5004 and the storage system performance information table 5005.

Specifically, the CPU 1403 in the migration destination storage system 1400 creates a new record entry in each of the storage system settings table 5004 and the storage system performance information table 5005. The CPU 1403 in the migration destination storage system 1400 stores information about the created migration destination LU 1411 in the newly created record.

The computer system finishes the performance tuning process in the manner described above.

Figure 11:
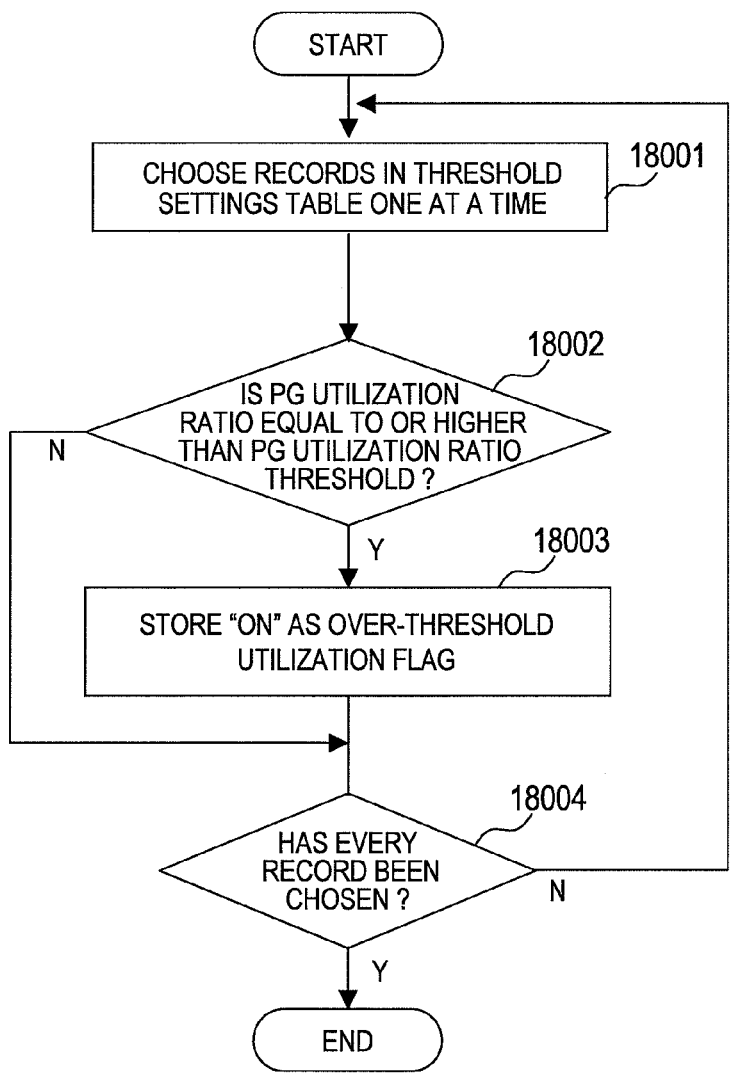
FIG. 11 is a flow chart for over-threshold utilization detecting process which is executed by the management host computer according to the first embodiment of this invention.

FIG. 11 is a flow chart for over-threshold utilization detecting process which is executed by the management host computer 1100 according to the first embodiment of this invention.

The over-threshold utilization detecting process is executed in Step 17002 of the performance tuning process shown in FIG. 10.

First, the CPU 1102 in the management host computer 1100 selects record entries of the threshold settings table 7003 one at a time starting from the top and proceeding downward (18001).

From the selected record, the CPU 1102 in the management host computer 1100 extracts the storage name 15001, the PG name 15002, and the PG utilization ratio threshold 15003.

The CPU 1102 in the management host computer 1100 selects, from the storage system performance information table 5005 received in Step 17001 of the performance turning process, every record entry whose storage name 13001 matches the extracted storage name 15001. From among the selected records of the storage system performance information table 5005, the CPU 1102 in the management host computer 1100 selects one whose PG name 13002 matches the extracted PG name 15002.

From the selected record, the CPU 1102 in the management host computer 1100 extracts the PG utilization ratio 13003. The CPU 1102 in the management host computer 1100 next judges whether or not the extracted PG utilization ratio 13003 is equal to or higher than the extracted PG utilization ratio threshold 15003 (18002).

When the PG utilization ratio 13003 is lower than the PG utilization ratio threshold 15003, the CPU 1102 in the management host computer 1100 stores "OFF" as the over-threshold utilization flag 15004 of the record selected from the threshold settings table 7003.

When the PG utilization ratio 13003 is equal to or higher than the PG utilization ratio threshold 15003, the CPU 1102 in the management host computer 1100 stores "OFF" as the over-threshold utilization flag 15004 of the record selected from the threshold settings table 7003 (18003).

The CPU 1102 in the management host computer 1100 next judges whether or not every record in the threshold settings table 7003 has been selected in Step 18001 (18004).

When there are any records in the threshold settings table 7003 that have not been selected, the CPU 1102 in the management host computer 1100 returns to Step 18001, where the CPU 1102 in the management host computer 1100 selects the next record from the threshold settings table 7003 and proceeds to Step 18002.

When there are no records left unselected in the threshold settings table 7003, the CPU 1102 in the management host computer 1100 ends this over-threshold utilization detecting process.

Figure 12:
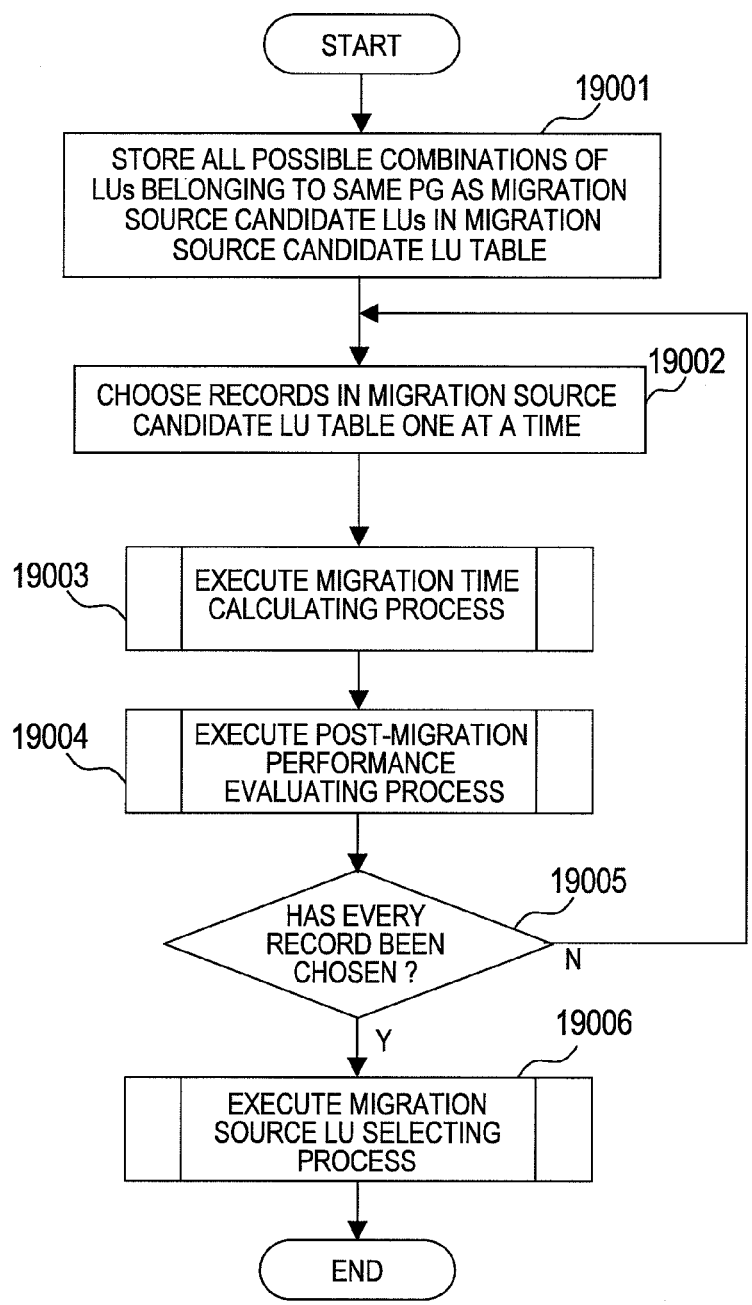
FIG. 12 is a flow chart for the migration source LU determining process which is executed by the management host computer according to the first embodiment of this invention.

FIG. 12 is a flow chart for the migration source LU determining process which is executed by the management host computer 1100 according to the first embodiment of this invention.

The migration source LU determining process is executed in Step 17003 of the performance tuning process shown in FIG. 10.

First, the CPU 1102 in the management host computer 1100 selects, from the threshold settings table 7003, a record entry that has "ON" as the over-threshold utilization flag 15004. From the selected record, the CPU 1102 in the management host computer 1100 extracts the storage name 15001 and the PG name 15002.

The CPU 1102 in the management host computer 1100 next selects, from the storage system settings table 5004 received in Step 17001 of the performance tuning process, every record entry whose storage name 11001 matches the extracted storage name 15001. From among the selected records of the storage system settings table 5004, the CPU 1102 in the management host computer 1100 selects every record whose PG name 11002 matches the extracted PG name 15002.

From each one of the selected records, the CPU 1102 in the management host computer 1100 extracts the LUN 11003, thereby identifying every LU 1411 belonging to the parity group 1410 that has exceeded a utilization ratio threshold.

The CPU 1102 in the management host computer 1100 next creates in the migration source candidate LU table 7004 as many record entries as all the possible combinations of the extracted LUNs 11003. The CPU 1102 in the management host computer 1100 respectively stores the combinations of the extracted LUNs 11003 in cells for the migration source candidate LUN 16001 in the created records (19001).

A case in which the extracted LUNs 11003 are "LU1", "LU2", "LU3", and "LU4" will be described. All the possible combinations of the extracted LUNs 11003 in this case are "LU1", "LU2", "LU3", "LU4", "LU1 and LU2", "LU1 and LU3", "LU1 and LU4", "LU2 and LU3", "LU2 and LU4", "LU3 and LU4", "LU1, LU2, and LU3", "LU1, LU2, and LU4", "LU1, LU3, and LU4", "LU2, LU3, and LU4", and "LU1, LU2, LU3, and LU4".

Next, the CPU 1102 in the management host computer 1100 selects record entries of the migration source candidate LU table 7004 one at a time starting from the top and proceeding downward (19002).

The CPU 1102 in the management host computer 1100 then executes a migration time calculating process (19003). Details of the migration time calculating process will be described with reference to FIG. 13.

The CPU 1102 in the management host computer 1100 then executes a post-migration performance evaluating process (19004). Details of the post-migration performance evaluating process will be described with reference to FIG. 14.

The CPU 1102 in the management host computer 1100 then judges whether or not every record entry in the migration source candidate LU table 7004 has been selected in Step 19002 (19005).

When there are any records in the migration source candidate LU table 7004 that have not been selected, the CPU 1102 in the management host computer 1100 returns to Step 19002, where the CPU 1102 in the management host computer 1100 selects the next record from the migration source candidate LU table 7004 and proceeds to Step 19003.

When there are no records left unselected in the migration source candidate LU table 7004, the CPU 1102 in the management host computer 1100 executes a migration source LU selecting process (19006). Details of the migration source LU selecting process will be described with reference to FIG. 15.

The CPU 1102 in the management host computer 1100 then ends this migration source LU determining process.

Figure 13:
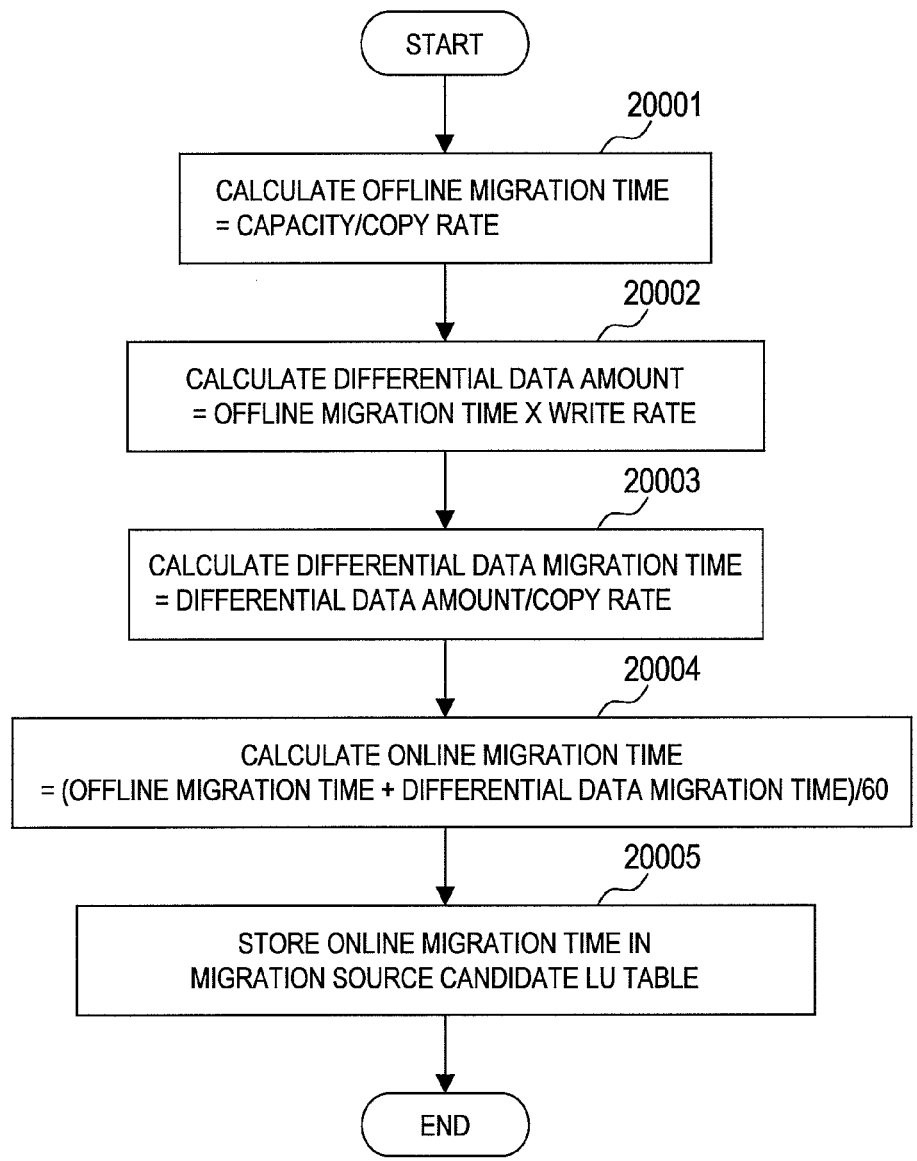
FIG. 13 is a flow chart for the migration time calculating process that is executed by the management host computer according to the first embodiment of this invention.

FIG. 13 is a flow chart for the migration time calculating process that is executed by the management host computer 1100 according to the first embodiment of this invention.

The migration time calculating process is executed in Step 19003 of the migration source LU determining process shown in FIG. 12.

First, the CPU 1102 in the management host computer 1100 extracts the migration source candidate LUN 16001 from the record in the migration source candidate LU table 7004 that has been selected in Step 19002 of the migration source LU determining process.

The CPU 1102 in the management host computer 1100 next select, from the storage system settings table 5004 received in Step 17001 of the performance tuning process, a record entry whose LUN 11003 matches the extracted migration source candidate LUN 16001. From the selected record, the CPU 1102 in the management host computer 1100 extracts the capacity 11004 and the copy rate 11005.

The CPU 1102 in the management host computer 1100 divides the extracted capacity 11004 by the extracted copy rate 11005, thus calculating an offline migration time of the LU 1411 that is identified by the extracted migration source candidate LUN 16001 (20001).

Next, the CPU 1102 in the management host computer 1100 selects, from the storage system performance information table 5005 received in Step 17001 of the performance tuning process, a record entry whose LUN 13004 matches the extracted migration source candidate LUN 16001. From the selected record, the CPU 1102 in the management host computer 1100 extracts the write rate 13006.

The CPU 1102 in the management host computer 1100 multiplies the calculated offline migration time by the extracted write rate 13006 and thus calculates a differential data amount, which indicates the amount of data written during migration (20002).

The CPU 1102 in the management host computer 1100 divides the calculated differential data amount by the extracted copy rate 11005 and thus calculates a differential data migration time, which indicates a time necessary to complete the migration of differential data (20003).

Next, the CPU 1102 in the management host computer 1100 adds the calculated differential data migration time to the calculated offline migration time, thus calculating an online migration time. The CPU 1102 in the management host computer 1100 divides the calculated online migration time by 60 to calculate an online migration time in minutes (20004).

The CPU 1102 in the management host computer 1100 stores the calculated online migration time as the online migration time 16002 of the record selected from the migration source candidate LU table 7004 in Step 19002 of the migration source LU determining process (20005).

The CPU 1102 in the management host computer 1100 then ends this migration time calculating process.

Described here is a case in which the extracted cell for the migration source candidate LUN 16001 holds the identifiers of the plurality of LUs 1411, in short, a case in which the plurality of LUs 1411 are migration source candidates.

The CPU 1102 in the management host computer 1100 in this case calculates an online migration time for each of the migration source candidate LUs 1411. The CPU 1102 in the management host computer 1100 sums up the calculated online migration times, thereby calculating an online migration time that is necessary if all the migration source candidate LUs 1411 are to migrate.

Figure 14:
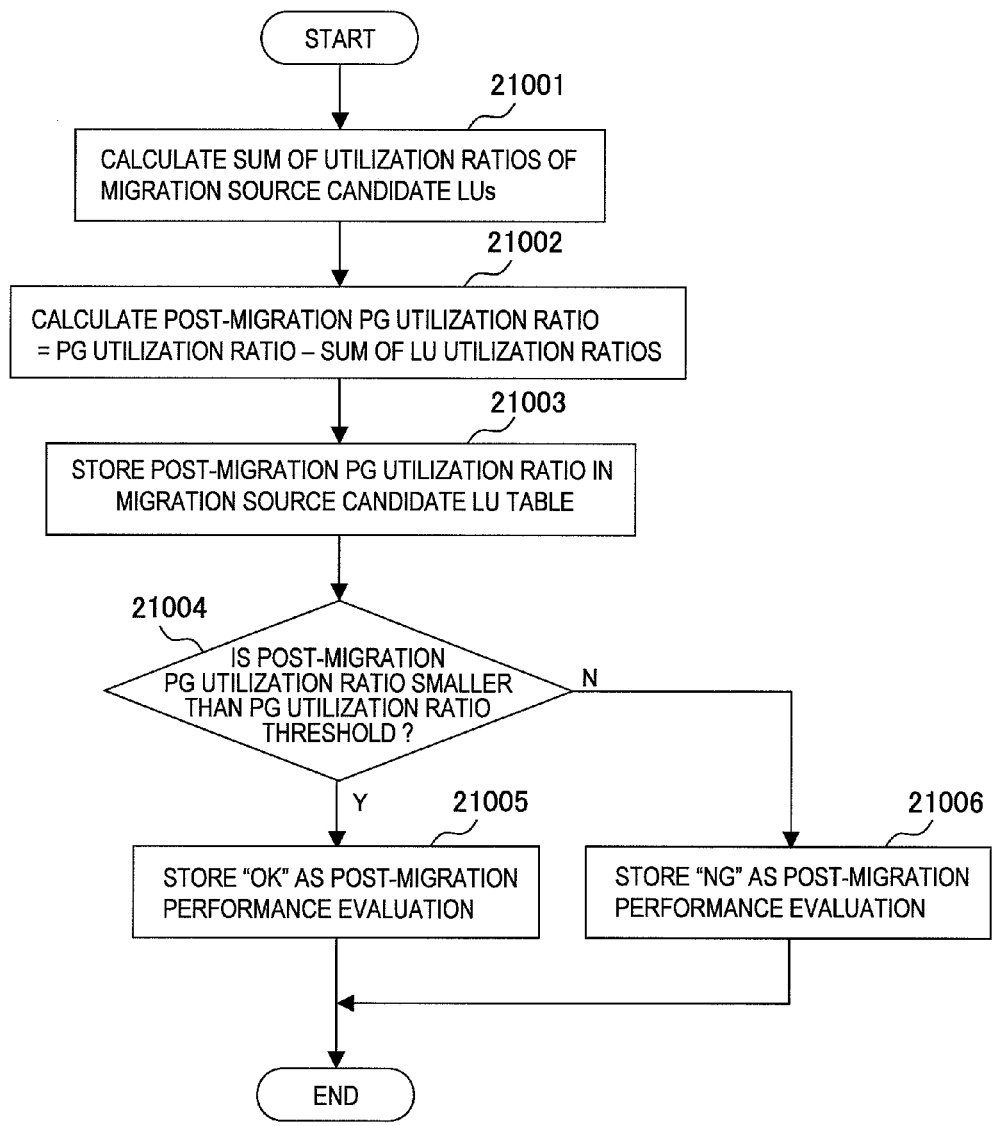
FIG. 14 is a flow chart for the post-migration performance evaluating process which is executed by the management host computer according to the first embodiment of this invention.

FIG. 14 is a flow chart for the post-migration performance evaluating process which is executed by the management host computer 1100 according to the first embodiment of this invention.

The post-migration performance evaluating process is executed in Step 19004 of the migration source LU determining process shown in FIG. 12.

First, the CPU 1102 in the management host computer 1100 extracts the migration source candidate LUN 16001 from the record in the migration source candidate LU table 7004 that has been selected in Step 19002 of the migration source LU determining process.

Next, the CPU 1102 in the management host computer 1100 selects from the storage system performance information table 5005 a record entry whose LUN 13004 matches the extracted migration source candidate LUN 16001. In the case where the extracted cell for the migration source candidate LUN 16001 holds the identifiers of the plurality of LUs 1411, the CPU 1102 in the management host computer 1100 selects every record in the storage system performance information table 5005 whose LUN 13004 matches any of the identifiers held in the extracted cell for the migration source candidate LUN 16001.

From each of the selected records, the CPU 1102 in the management host computer 1100 extracts the PG utilization ratio 13003 and the LU utilization ratio 13005. The CPU 1102 in the management host computer 1100 calculates the sum of all the extracted LU utilization ratios 13005 (21001).

The CPU 1102 in the management host computer 1100 subtracts the calculated sum of the LU utilization ratios 13005 from the extracted PG utilization ratio 13003, thereby calculating a post-migration PG utilization ratio (21002).

The CPU 1102 in the management host computer 1100 stores the calculated post-migration PG utilization ratio as the post-migration utilization ratio 16003 of the record selected from the migration source candidate LU table 7004 in Step 19002 of the migration source LU determining process (21003).

Next, the CPU 1102 in the management host computer 1100 extracts the PG utilization ratio threshold 15003 from the record in the threshold settings table 7003 that has been selected in Step 19001 of the migration source LU determining process. The CPU 1102 in the management host computer 1100 judges whether or not the calculated post-migration PG utilization ratio is equal to or higher than the extracted PG utilization ratio threshold 15003 (21004).

When the post-migration PG utilization ratio is equal to or higher than the PG utilization ratio threshold 15003, the CPU 1102 in the management host computer 1100 stores "NG" as the post-migration performance evaluation 16004 of the record selected from the threshold settings table 7003 in Step 19001 of the migration source LU determining process (21006). The CPU 1102 in the management host computer 1100 then ends this post-migration performance evaluating process.

When the post-migration PG utilization ratio is lower than the PG utilization ratio threshold 15003, on the other hand, the CPU 1102 in the management host computer 1100 stores "OK" as the post-migration performance evaluation 16004 of the record selected from the threshold settings table 7003 in Step 19001 of the migration source LU determining process (21005). The CPU 1102 in the management host computer 1100 then ends this post-migration performance evaluating process.

Figure 15:
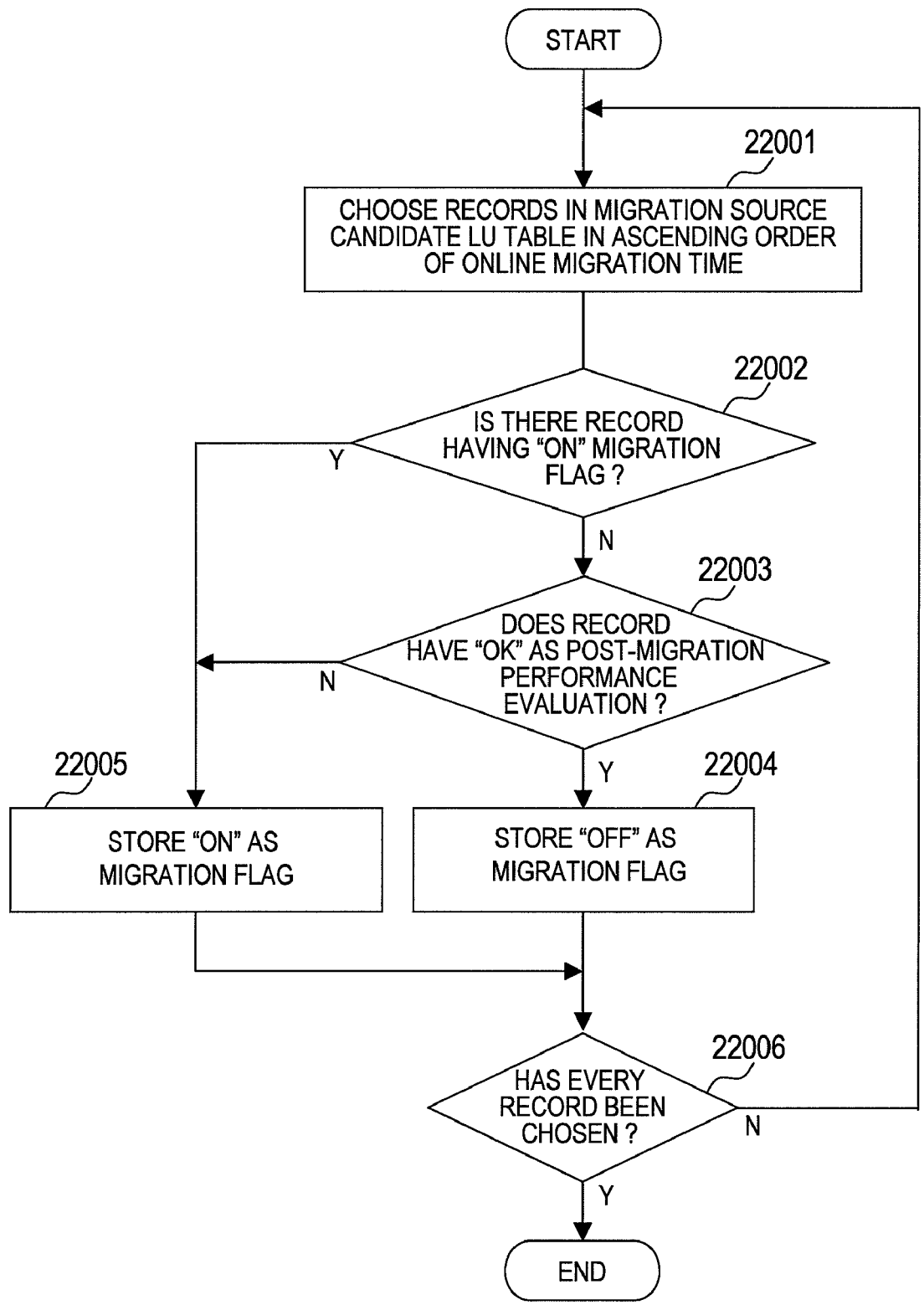
FIG. 15 is a flow chart for the migration source LU selecting process that is executed by the management host computer according to the first embodiment of this invention.

FIG. 15 is a flow chart for the migration source LU selecting process that is executed by the management host computer 1100 according to the first embodiment of this invention.

The migration source LU selecting process is executed in Step 19006 of the migration source LU determining process shown in FIG. 12.

First, the CPU 1102 in the management host computer 1100 selects record entries in the migration source candidate LU table 7004 one at a time in an ascending order of the online migration time 16002 (22001).

Next, the CPU 1102 in the management host computer 1100 judges whether or not the migration source candidate LU table 7004 holds a record entry that has "ON" as the migration flag 16005 (22002).

When a record having an "ON" migration flag is found in the table, the CPU 1102 in the management host computer 1100 excludes, as a migration source, the LU 1411 that is identified by the migration source candidate LUN 16001 of the selected record. The CPU 1102 in the management host computer 1100 accordingly stores "OFF" as the migration flag 16005 of the selected record (22005).

When no record in the migration source candidate LU table 7004 has an "ON" migration flag, the CPU 1102 in the management host computer 1100 judges whether or not the post-migration performance evaluation 16004 of the selected record has a value "OK" (22003).

When the post-migration performance evaluation 16004 of the selected record has a value "NG", the CPU 1102 in the management host computer 1100 excludes, as a migration source, the LU 1411 that is identified by the migration source candidate LUN 16001 of the selected record. The CPU 1102 in the management host computer 1100 accordingly stores "OFF" as the migration flag 16005 of the selected record (22005).

When the post-migration performance evaluation 16004 of the selected record has a value "OK", the CPU 1102 in the management host computer 1100 sets, as a migration source, the LU 1411 that is identified by the migration source candidate LUN 16001 of the selected record. The CPU 1102 in the management host computer 1100 accordingly stores "ON" as the migration flag 16005 of the selected record (22004).

Next, the CPU 1102 in the management host computer 1100 judges whether or not every record entry in the migration source candidate LU table 7004 has been selected in Step 22001 (22006).

When there are any records in the migration source candidate LU table 7004 that have not been selected, the CPU 1102 in the management host computer 1100 returns to Step 22001, where the CPU 1102 in the management host computer 1100 selects the next record from the migration source candidate LU table 7004 and proceeds to Step 22002.

When every record in the migration source candidate LU table 7004 has been selected, the CPU 1102 in the management host computer 1100 ends this migration source LU selecting process.

According to this embodiment, when the utilization ratio of one parity group 1410 in the storage system 1400 reaches or exceeds a threshold, data migration is performed to move data from the LU 1411 that belongs to this parity group 1410 to another parity group 1410. The LU 1411 that requires a shorter online migration time than other LUs 1411 is selected as a migration source from which data is moved. The utilization ratio of the parity group 1410 is thus lowered below the threshold within a reduced time.

Second Embodiment

In a second embodiment of this invention, the management host computer 1100 takes into account an offline migration time as well as an online migration time in determining which LU 1411 is to migrate.

Figure 16:
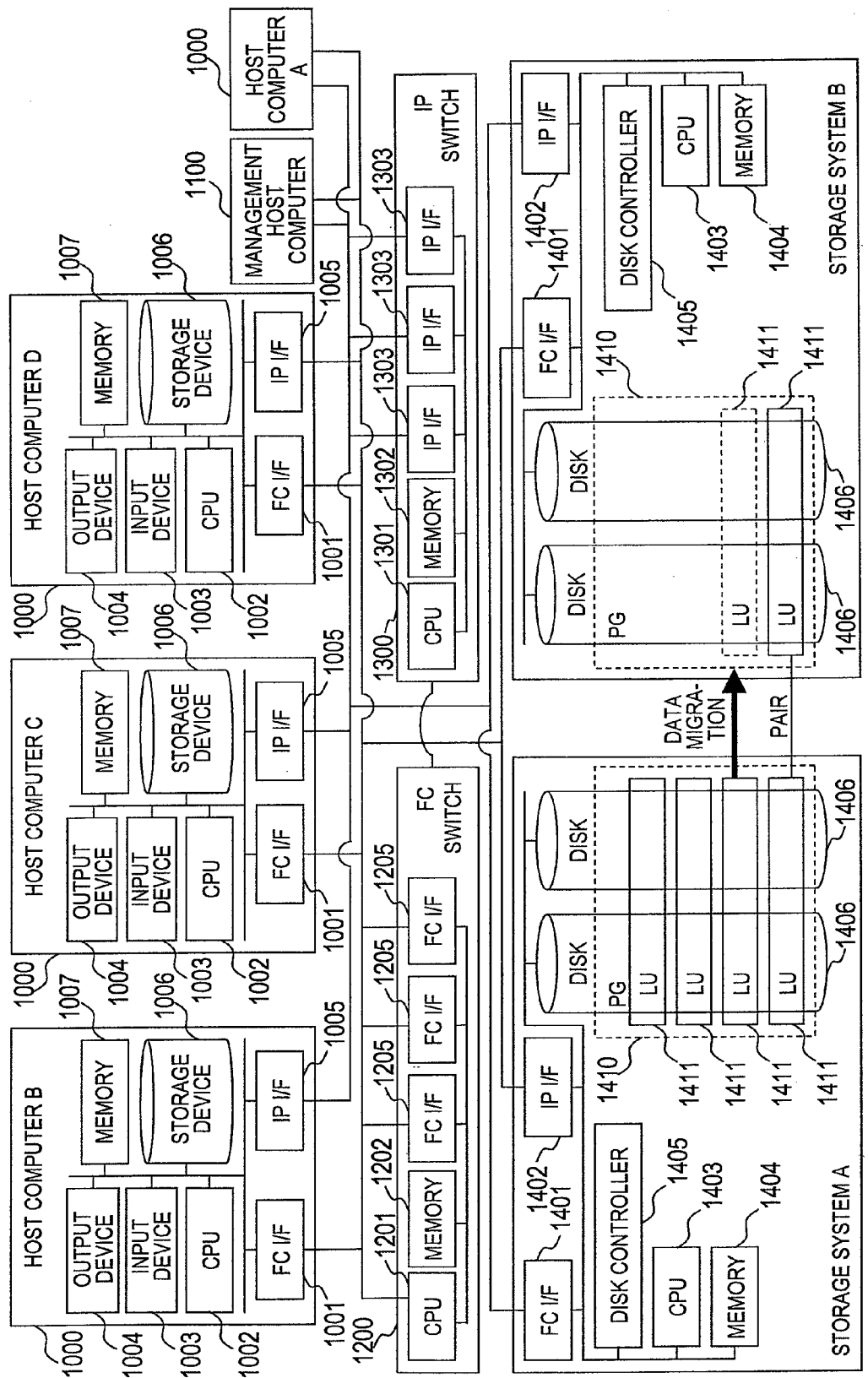
FIG. 16 is a block diagram showing the configuration of a computer system according to the second embodiment of this invention.

FIG. 16 is a block diagram showing the configuration of a computer system according to the second embodiment of this invention.

The computer system of the second embodiment has the same configuration as that of the computer system of the first embodiment which is shown in FIG. 1, except for the host settings table 2003 stored in the host computer 1000, the migration source candidate LU table 7004 stored in the management host computer 1100, and the storage system settings table 5004 stored in the storage systems 1400. In the second embodiment, components common to those in the first embodiment are denoted by the same reference symbols and their descriptions will be omitted.

In the second embodiment, the LU 1411 that is provided by the storage system A 1400 and the LU 1411 that is provided by the storage system B 1400 may form a copy pair.

FIG. 17 is a configuration diagram of the host settings table 2003 that is stored in the memory 1007 of the host computer 1000 according to the second embodiment of this invention.

The host settings table 2003 contains a host name 8001, a used LUN 8002, a connected IF name 8003, and online migration flag 8004.

The host name 8001, the used LUN 8002, and the connected IF name 8003 are the same as those in the host settings table 2003 of the first embodiment which is shown in FIG. 5, and their descriptions will not be repeated here.

The online migration flag 8004 indicates whether or not data needs to be migrated online from the LU 1411 that is identified by the used LUN 8002 of a record entry in question. When the LU 1411 that is identified by the used LUN 8002 of a record entry in question needs online data migration, "necessary" is stored for the online migration flag 8004 of the record. When data migration from the LU 1411 that is identified by the used LUN 8002 of a record entry in question can be performed offline because the data does not need online migration, "unnecessary" is stored for the online migration flag 8004 of the record.

FIG. 18 is a configuration diagram of the migration source candidate LU table 7004 that is stored in the memory 1107 of the management host computer 1100 according to the second embodiment of this invention.

The migration source candidate LU table 7004 contains a migration source candidate LUN 16001, an online migration time 16002, a post-migration PG utilization ratio 16003, a post-migration performance evaluation 16004, a migration flag 16005, offline migration time 16006, and migration time 16007.

The migration source candidate LUN 16001, the online migration time 16002, the post-migration PG utilization ratio 16003, the post-migration performance evaluation 16004, and the migration flag 16005 are the same as those in the migration source candidate LU table 7004 of the first embodiment which is shown in FIG. 7, and their descriptions will not be repeated here.

The offline migration time 16006 indicates a time necessary for data to migrate offline from the LU 1411 that is identified by the migration source candidate LUN 16001 of a record in question. Offline data migration is data migration that is executed while access from the host computer 1000 to the LU 1411 in question is stopped.

In the migration source candidate LU table 7004 of this embodiment, a value is stored as only one of the online migration time 16002 and the offline migration time 16006.

The migration time 16007 indicates a time necessary for migration of data from the LU 1411 that is identified by the migration source candidate LUN 16001 of a record entry in question. Therefore, the migration time 16007 has the same value as the online migration time 16002 or the offline migration time 16006 of the record.

FIG. 19 is a configuration diagram of the storage system settings table 5004 that is stored in the memory 1404 of each storage system 1400 according to the second embodiment of this invention.

The storage system settings table 5004 contains a storage name 11001, a PG name 11002, an LUN 11003, a capacity 11004, a copy rate 11005, and a paired LUN 11006.

The storage name 11001, the PG name 11002, the LUN 11003, the capacity 11004, and the copy rate 11005 are the same as those in the storage system settings table 5004 of the first embodiment which is shown in FIG. 8, and their descriptions will not be repeated here.

The paired LUN 11006 indicates an identifier unique to the LU 1411 that forms a copy pair with the LU 1411 identified by the LUN 11003 of a record entry in question. In the case where the LU 1411 that is identified by the LUN 11003 of a record entry in question does not form a copy pair, no value is stored as the paired LUN 11006.

The storage system settings table 5004 may contain, in place of the paired LUN 11006, information that indicates whether migration of data from the LU 1411 in question is possible or not.

Described next are processes of the computer system according to the second embodiment of this invention. The processes performed by the computer system of the second embodiment are the same as the ones performed by the computer system of the first embodiment, except the migration time calculating process and the migration source LU selecting process. In the second embodiment, descriptions on processes common to those in the first embodiment will be omitted.

Figure 20:
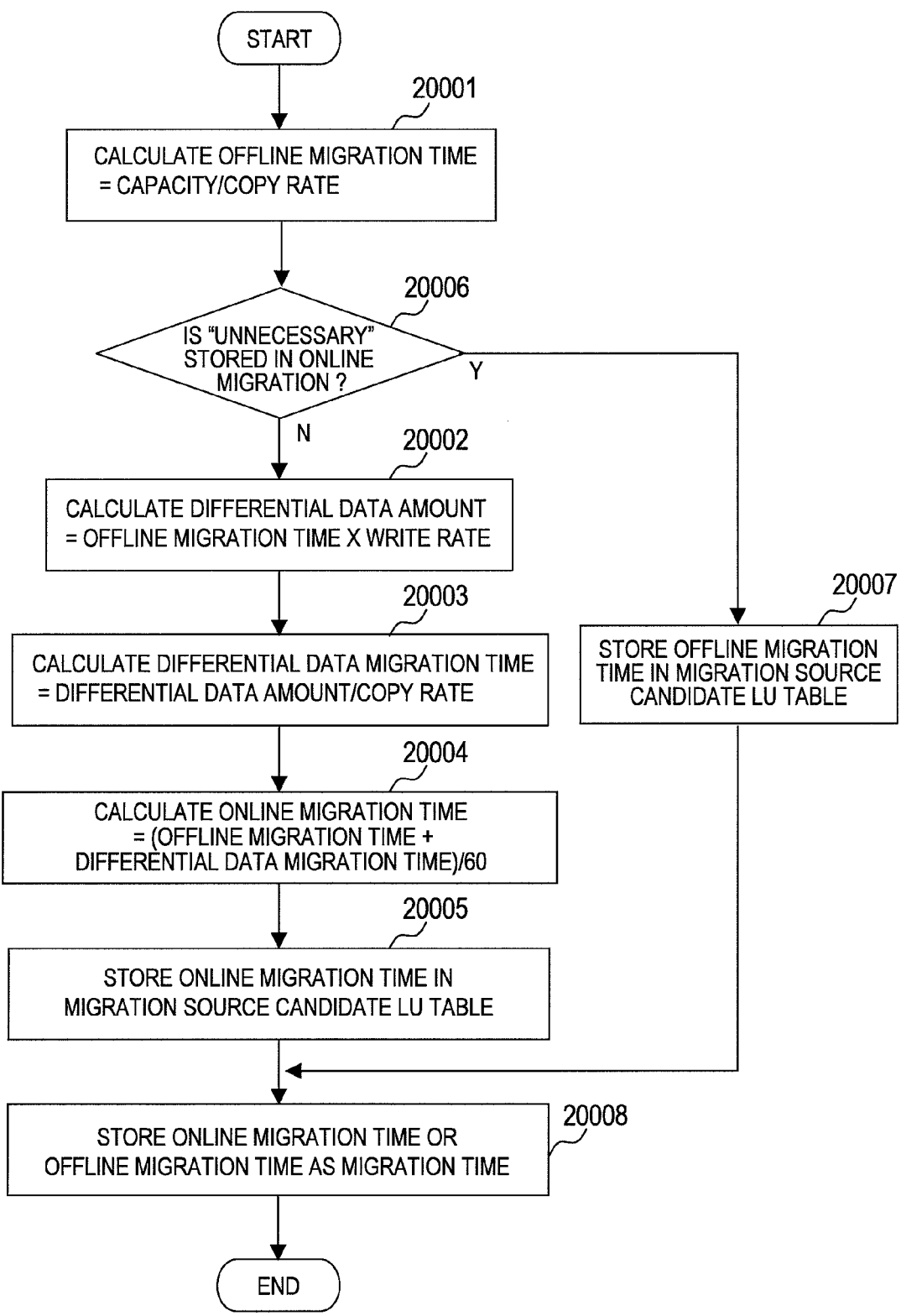
FIG. 20 is a flow chart for the migration time calculating process that is executed by the management host computer according to the second embodiment of this invention.

FIG. 20 is a flow chart for the migration time calculating process that is executed by the management host computer 1100 according to the second embodiment of this invention.

The migration time calculating process is executed in Step 19003 of the migration source LU determining process shown in FIG. 12.

First, the CPU 1102 in the management host computer 1100 extracts the migration source candidate LUN 16001 from the record in the migration source candidate LU table 7004 that has been selected in Step 19002 of the migration source LU determining process.

The CPU 1102 in the management host computer 1100 next selects, from the storage system settings table 5004 received in Step 17001 of the performance tuning process, a record entry whose LUN 11003 matches the extracted migration source candidate LUN 16001. From the selected record, the CPU 1102 in the management host computer 1100 extracts the capacity 11004 and the copy rate 11005.

The CPU 1102 in the management host computer 1100 divides the extracted capacity 11004 by the extracted copy rate 11005, thus calculating an offline migration time of the LU 1411 that is identified by the extracted migration source candidate LUN 16001 (20001).

The CPU 1102 in the management host computer 1100 next judges whether or not data in the LU 1411 that is identified by the extracted migration source candidate LUN 16001 needs online migration.

For instance, the CPU 1102 in the management host computer 1100 receives the host settings table 2003 from the host computer 1000. The CPU 1102 in the management host computer 1100 selects from the received host settings table 2003 a record entry whose used LUN 8002 matches the extracted migration source candidate LUN 16001.

Next, the CPU 1102 in the management host computer 1100 judges whether or not the online migration flag 8004 of the selected record has a value "unnecessary" (20006).

When the online migration flag 8004 has a value "unnecessary", it means that data in the LU 1411 that is identified by the extracted migration source candidate LUN 16001 does not need online migration. The CPU 1102 in the management host computer 1100 accordingly stores the calculated offline migration time as the offline migration time 16006 of the record selected from the migration source candidate LU table 7004 in Step 19002 of the migration source LU determining process (20007). The CPU 1102 in the management host computer 1100 then proceeds to Step 20008.

When the online migration flag 8004 has a value "necessary", on the other hand, it means that data in the LU 1411 that is identified by the extracted migration source candidate LUN 16001 needs online migration.

Next, the CPU 1102 in the management host computer 1100 selects, from the storage system performance information table 5005 received in Step 17001 of the performance tuning process, a record entry whose LUN 13004 matches the extracted migration source candidate LUN 16001. From the selected record, the CPU 1102 in the management host computer 1100 extracts the write rate 13006.

The CPU 1102 in the management host computer 1100 multiplies the calculated offline migration time by the extracted write rate 13006 and thus calculates a differential data amount, which indicates the amount of data written during migration (20002).

The CPU 1102 in the management host computer 1100 divides the calculated differential data amount by the extracted copy rate 11005 and thus calculates a differential data migration time, which indicates a time necessary to complete the migration of differential data (20003).

Next, the CPU 1102 in the management host computer 1100 adds the calculated differential data migration time to the calculated offline migration time, thus calculating an online migration time. The CPU 1102 in the management host computer 1100 divides the calculated online migration time by 60 to calculate an online migration time in minutes (20004).

The CPU 1102 in the management host computer 1100 stores the calculated online migration time as the online migration time 16002 of the record selected from the migration source candidate LU table 7004 in Step 19002 of the migration source LU determining process (20005).

Next, the CPU 1102 in the management host computer 1100 stores, as the migration time 16007 of the record selected from the migration source candidate LU table 7004 in Step 19002 of the migration source LU determining process, the value of whichever one of the online migration time 16002 and offline migration time 16006 of the selected record whose value is stored (20008).

The CPU 1102 in the management host computer 1100 then ends this migration time calculating process.

Described here is a case in which the extracted cell for the migration source candidate LUN 16001 holds the identifiers of the plurality of LUs 1411, in short, a case in which the plurality of LUs 1411 are migration source candidates.

The CPU 1102 in the management host computer 1100 in this case calculates a migration time for each of the migration source candidate LUs 1411. The CPU 1102 in the management host computer 1100 sums up the calculated migration times, thereby calculating a migration time that is necessary if all the migration source candidate LUs 1411 are to migrate.

Figure 21:
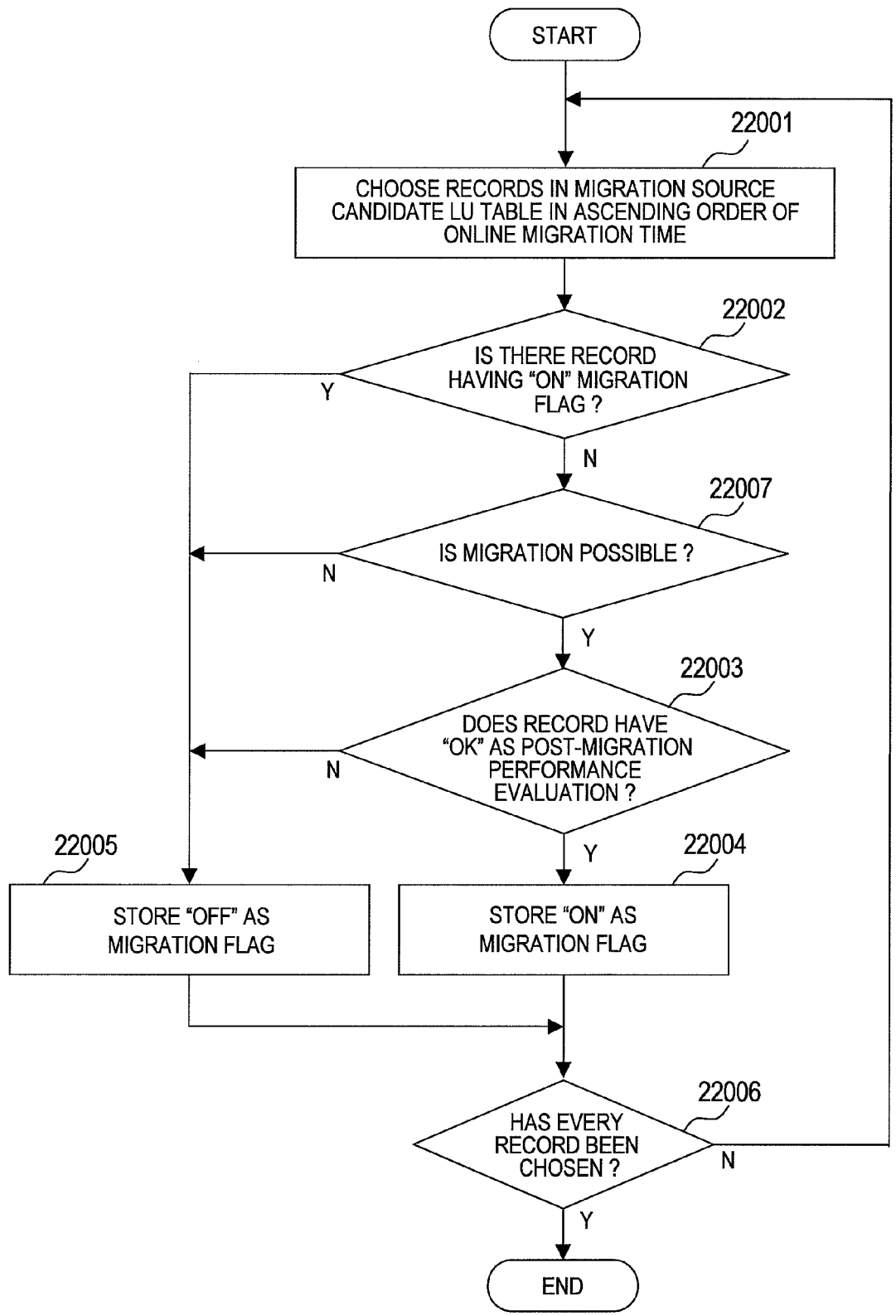
FIG. 21 is a flow chart for the migration source LU selecting process that is executed by the management host computer according to the second embodiment of this invention.

FIG. 21 is a flow chart for the migration source LU selecting process that is executed by the management host computer 1100 according to the second embodiment of this invention.

The migration source LU selecting process is executed in Step 19006 of the migration source LU determining process shown in FIG. 12.

First, the CPU 1102 in the management host computer 1100 selects record entries in the migration source candidate LU table 7004 one at a time in ascending order of their migration time 16007 (22001).

Next, the CPU 1102 in the management host computer 1100 judges whether or not the migration source candidate LU table 7004 holds a record entry that has "ON" as the migration flag 16005 (22002).

When a record having an "ON" migration flag is found in the table, the CPU 1102 in the management host computer 1100 excludes, as a migration source, the LU 1411 that is identified by the migration source candidate LUN 16001 of the selected record. The CPU 1102 in the management host computer 1100 accordingly stores "OFF" as the migration flag 16005 of the selected record (22005).

When no record in the migration source candidate LU table 7004 has an "ON" migration flag, the CPU 1102 in the management host computer 1100 judges whether or not migration is possible for data in the LU 1411 that is identified by the migration source candidate LUN 16001 of the selected record (22007).

Specifically, the CPU 1102 in the management host computer 1100 selects, from the storage system settings table 5004 received in Step 17001 of the performance tuning process, a record entry whose LUN 11003 matches the migration source candidate LUN 16001 of the record selected from the migration source candidate LU table 7004. The CPU 1102 in the management host computer 1100 judges whether or not there is a value stored as the paired LUN 11006 of the record selected from the storage system settings table 5004.

When there is a value stored as the paired LUN 11006, it means that migration is not possible for data in the LU 1411 that is identified by the migration source candidate LUN 16001 of the record selected from the migration source candidate LU table 7004. The CPU 1102 in the management host computer 1100 accordingly stores "OFF" as the migration flag 16005 of this record (22005).

When there is no value stored as the paired LUN 11006, it means that migration is possible for data in the LU 1411 that is identified by the migration source candidate LUN 16001 of the record selected from the migration source candidate LU table 7004. Then the CPU 1102 in the management host computer 1100 judges whether or not the post-migration performance evaluation 16004 of the selected record has a value "OK" (22003).

When the post-migration performance evaluation 16004 of the selected record has a value "NG", the CPU 1102 in the management host computer 1100 excludes, as a migration source, the LU 1411 that is identified by the migration source candidate LUN 16001 of the selected record. The CPU 1102 in the management host computer 1100 accordingly stores "OFF" as the migration flag 16005 of the selected record (22005).

When the post-migration performance evaluation 16004 of the selected record has a value "OK", the CPU 1102 in the management host computer 1100 sets, as a migration source, the LU 1411 that is identified by the migration source candidate LUN 16001 of the selected record. The CPU 1102 in the management host computer 1100 accordingly stores "ON" as the migration flag 16005 of the selected record (22004).

Next, the CPU 1102 in the management host computer 1100 judges whether or not every record entry in the migration source candidate LU table 7004 has been selected in Step 22001 (22006).

When there are any records in the migration source candidate LU table 7004 that have not been selected, the CPU 1102 in the management host computer 1100 returns to Step 22001, where the CPU 1102 in the management host computer 1100 selects the next record from the migration source candidate LU table 7004 and proceeds to Step 22002.

When every record in the migration source candidate LU table 7004 has been selected, the CPU 1102 in the management host computer 1100 ends this migration source LU selecting process.

According to this embodiment, when the utilization ratio of one parity group 1410 in the storage system 1400 reaches or exceeds a threshold, data migration is performed to move data from the LU 1411 that belongs to this parity group 1410 to another parity group 1410. The LU 1411 that requires a shorter migration time than other LUs 1411 is selected as a migration source from which data is moved. The utilization ratio of the parity group 1410 is thus lowered below the threshold within a reduced time. A migration time in this embodiment takes into account online migration and offline migration both.

Further, this embodiment excludes as a migration source the LU 1411 from which data cannot migrate.

Third Embodiment

In the first and second embodiments of this invention, which parity group 1410 serves as the migration destination is determined in advance. In a third embodiment of this invention, one out of a plurality of parity groups 1410 is determined as the migration destination. The third embodiment is applicable to both the first and second embodiments. Described here is a case in which the third embodiment is applied to the first embodiment.

Figure 22:
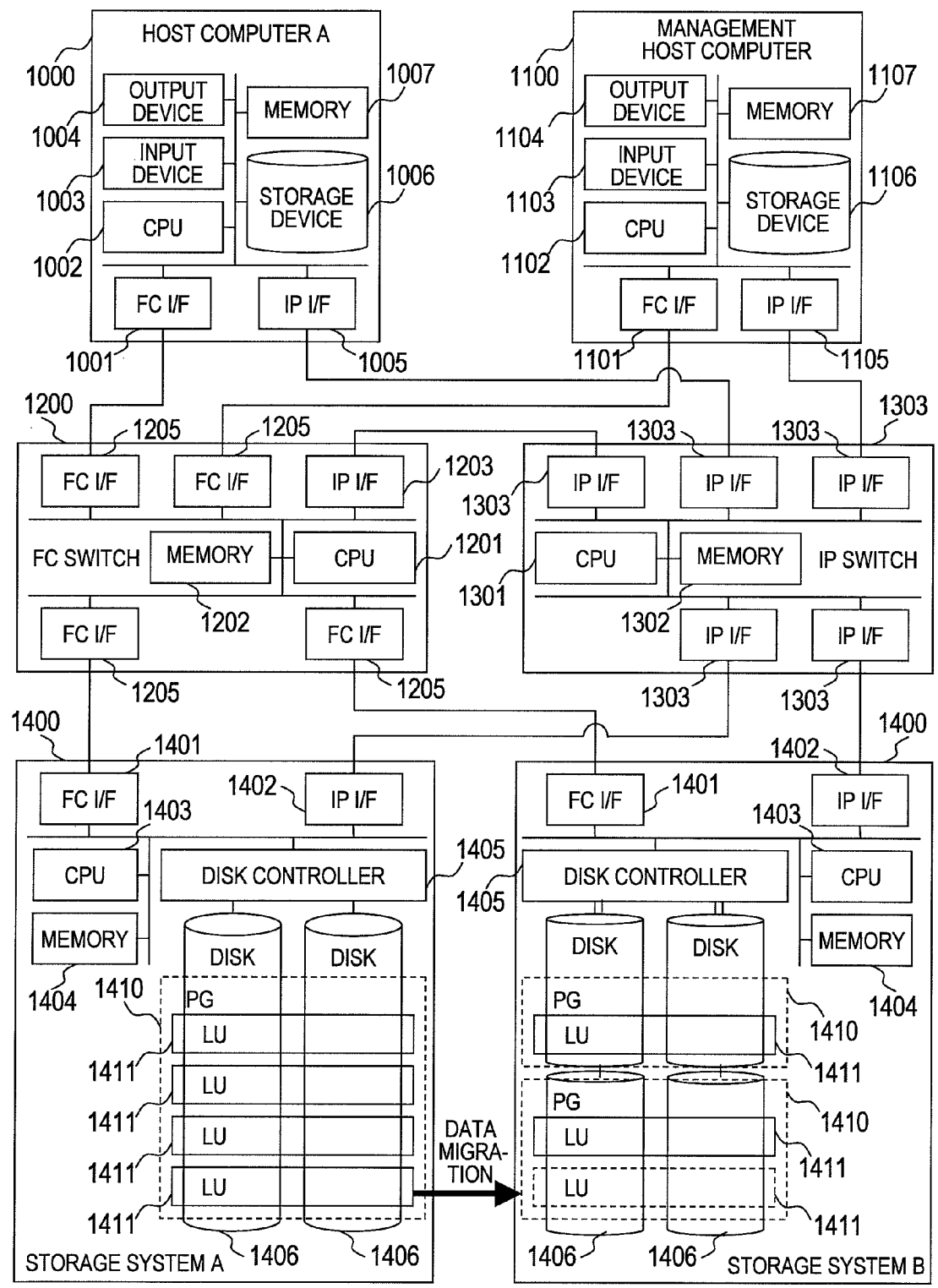
FIG. 22 is a block diagram showing the configuration of a computer system according to the third embodiment of this invention.

FIG. 22 is a block diagram showing the configuration of a computer system according to the third embodiment of this invention.

The computer system of the third embodiment has the same configuration as that of the computer system of the first embodiment which is shown in FIG. 1, except for the migration source candidate LU table 7004 stored in the management host computer 1100. In the third embodiment, components common to those in the first embodiment are denoted by the same reference numerals and their descriptions will be omitted.

In the third embodiment, a plurality of migration destination candidate parity groups 1410 are built in the storage system 1400.

FIG. 23 is a configuration diagram of the migration source candidate LU table 7004 that is stored in the memory 1107 of the management host computer 1100 according to the third embodiment of this invention.

The migration source candidate LU table 7004 contains a migration source candidate LUN 16001, an online migration time 16002, a post-migration PG utilization ratio 16003, a post-migration performance evaluation 16004, a migration flag 16005, and a migration destination PG 16008.

The migration source candidate LUN 16001, the online migration time 16002, the post-migration PG utilization ratio 16003, the post-migration performance evaluation 16004, and the migration flag 16005 are the same as those in the migration source candidate LU table 7004 of the first embodiment which is shown in FIG. 7, and their descriptions will not be repeated here.

The migration destination PG 16008 indicates an identifier unique to the parity group 1410 to which data migrates from the LU 1411 that is identified by the migration source candidate LUN 16001 of a record entry in question.

Described next are processes of the computer system according to the third embodiment of this invention. The processes performed by the computer system of the third embodiment are the same as the ones performed by the computer system of the first embodiment, except the migration source LU determining process. In the third embodiment, descriptions on processes common to those in the first embodiment will be omitted.

Figure 24:
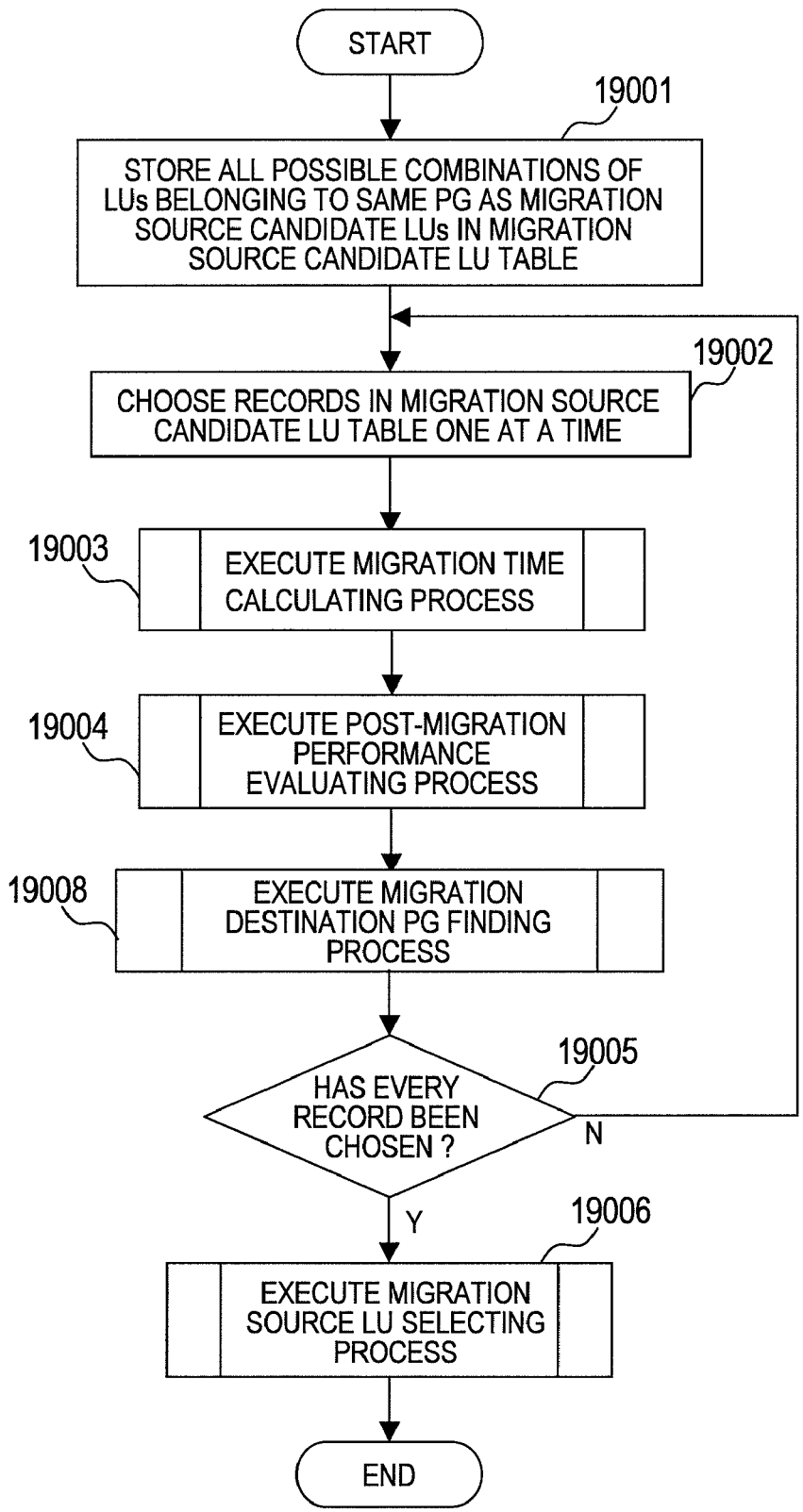
FIG. 24 is a flow chart for the migration source LU determining process that is executed by the management host computer according to the third embodiment of this invention.

FIG. 24 is a flow chart for the migration source LU determining process that is executed by the management host computer 1100 according to the third embodiment of this invention.

The migration source LU determining process is executed in Step 17003 of the performance tuning process shown in FIG. 10.

First, the CPU 1102 in the management host computer 1100 executes Steps 19001 to 19004. Steps 19001 to 19004 of FIG. 24 are the same as the ones of FIG. 12, which shows the migration source LU determining process of the first embodiment, and their descriptions will not be repeated here.

Next, the CPU 1102 in the management host computer 1100 executes a migration destination PG finding process (19008). Details of the migration destination PG finding process will be described with reference to FIG. 25.

Next, the CPU 1102 in the management host computer 1100 executes Steps 19005 and 19006. Steps 19005 and 19006 of FIG. 24 are the same as the ones of FIG. 12, which shows the migration source LU determining process of the first embodiment, and their descriptions will not be repeated here.

Figure 25:
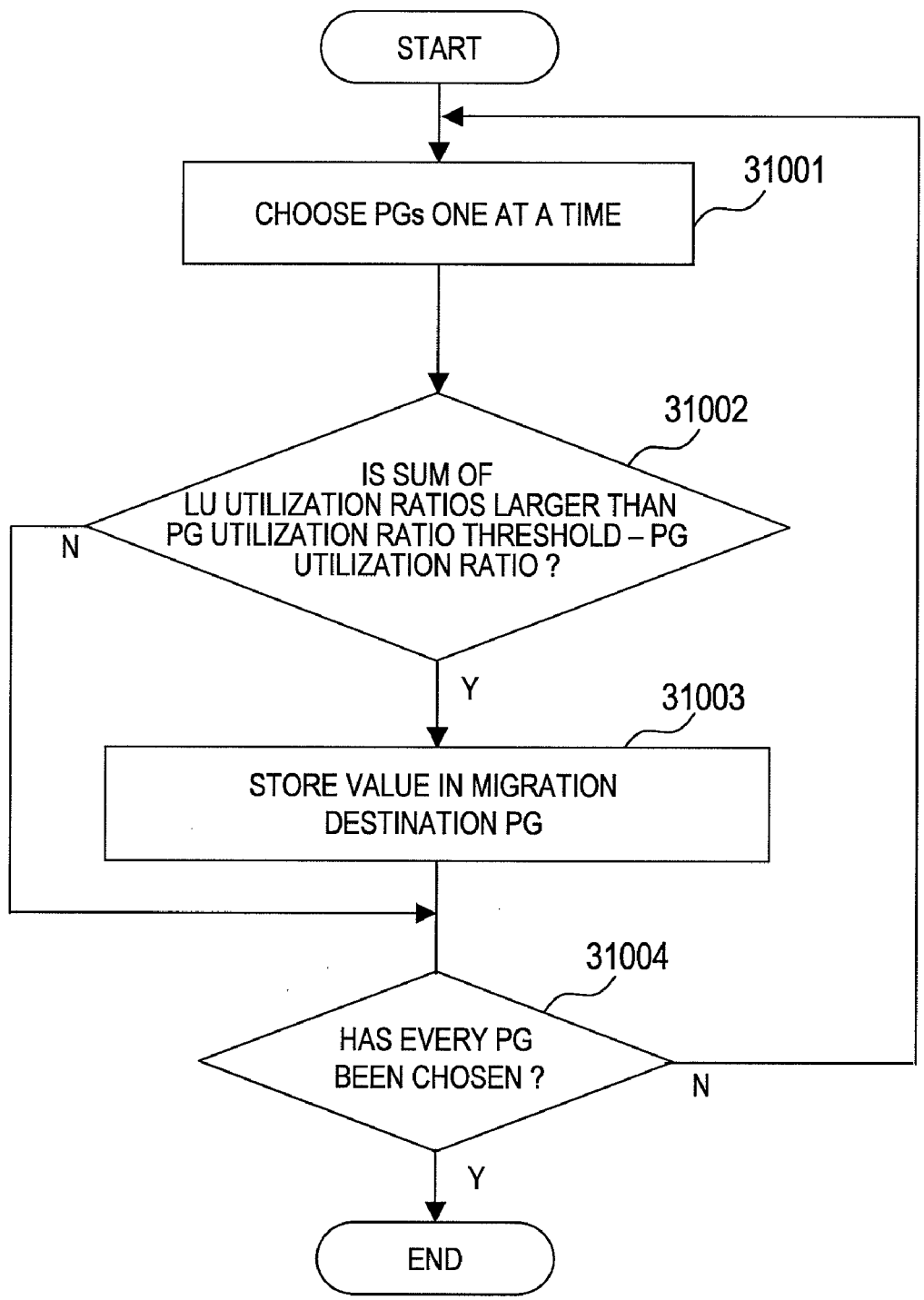
FIG. 25 is a flow chart for the migration destination PG determining process that is executed by the management host computer according to the third embodiment of this invention.

FIG. 25 is a flow chart for the migration destination PG determining process that is executed by the management host computer 1100 according to the third embodiment of this invention.

The migration destination PG determining process is executed in Step 19008 of the migration source LU determining process shown in FIG. 24.

First, the CPU 1102 in the management host computer 1100 extracts the migration source candidate LUN 16001 from the record in the migration source candidate LU table 7004 that has been selected in Step 19002 of the migration source LU determining process.

The CPU 1102 in the management host computer 1100 next select, from the storage system settings table 5004 received in Step 17001 of the performance tuning process, a record entry whose LUN 11003 matches the extracted migration source candidate LUN 16001. From the selected record, the CPU 1102 in the management host computer 1100 extracts all the PG names 11002 that do not match the PG name 11002 of the selected record entry.

The CPU 1102 in the management host computer 1100 selects the extracted PG names 11002 one at a time. The CPU 1102 in the management host computer 1100 thus selects, one by one, all parity groups 1410 that do not contain the LU 1411 that is identified by the extracted migration source candidate LUN 16001 (31001).

The CPU 1102 in the management host computer 1100 next selects, from the storage system performance information table 5005 received in Step 17001 of the performance tuning process, a record entry whose PG name 13002 matches the selected PG name 11002.

From the selected record, the CPU 1102 in the management host computer 1100 extracts the PG utilization ratio 13003. The CPU 1102 in the management host computer 1100 then selects a record entry whose PG name 15002 matches the selected PG name 11002 from the threshold settings table 7003. From the selected record, the CPU 1102 in the management host computer 1100 extracts the PG utilization ratio threshold 15003.

The CPU 1102 in the management host computer 1100 selects, from the storage system performance information table 5005 received in Step 17001 of the performance tuning process, a record entry whose LUN 13004 matches the extracted migration source candidate LUN 16001. From the selected record, the CPU 1102 in the management host computer 1100 extracts the LU utilization ratio 13005.

Next, the CPU 1102 in the management host computer 1100 subtracts the extracted PG utilization ratio 13003 from the extracted PG utilization ratio threshold 15003. The CPU 1102 in the management host computer 1100 judges whether or not the subtraction result is smaller than the extracted LU utilization ratio 13005 (31002).

In the case where the extracted cell for the migration source candidate LUN 16001 holds the identifiers of the plurality of LUs 1411, the CPU 1102 in the management host computer 1100 selects every record entry in the storage system performance information table 5005 whose LUN 13004 matches any one of the identifiers extracted as the migration source candidate LUN 16001. From each one of the selected records, the CPU 1102 in the management host computer 1100 extracts the LU utilization ratio 13005.

The CPU 1102 in the management host computer 1100 then judges whether or not the subtraction result is smaller than the sum of all the extracted LU utilization ratios 13005 (31002).

When the subtraction result is equal to or larger than the LU utilization ratio 13005, it makes the utilization ratio of the migration destination parity group 1410 after the migration equal to or higher than the PG utilization threshold 15003. The parity group 1410 that is identified by the extracted PG name 11002 therefore cannot serve as a migration destination. Then the CPU 1102 in the management host computer 1100 proceeds directly to Step 31004.

When the subtraction result is smaller than the LU utilization ratio 13005, it makes the utilization ratio of the migration destination parity group 1410 after the migration lower than the PG utilization threshold 15003. The parity group 1410 that is identified by the extracted PG name 11002 can therefore serve as a migration destination. Then the CPU 1102 in the management host computer 1100 stores the extracted PG name 11002 as the migration destination PG 16008 of the record selected from the migration source candidate LU table 7004 in Step 19002 of the migration source LU determining process (31003).

The CPU 1102 in the management host computer 1100 next judges whether or not every PG name 11002 extracted in Step 31001 has been selected (31004).

When there are any extracted PG names 11002 that have not been selected, the CPU 1102 in the management host computer 1100 returns to Step 31001, where the CPU 1102 in the management host computer 1100 selects the next PG name 11002 and proceeds to Step 31002.

When every extracted PG name 11002 has been selected, the CPU 1102 in the management host computer 1100 ends this migration destination PG determining process.

In the case where the identifiers of the plurality of parity groups 1410 are stored as the migration destination PG 16008 in the migration source candidate LU table 7004, the CPU 1102 in the management host computer 1100 refers to the utilization ratios of those parity groups 1410, the write rates of the parity groups 1410, or the like to determine one of the parity groups 1410 as the migration destination.

According to this embodiment, when the utilization ratio of one parity group 1410 in the storage system 1400 reaches or exceeds a threshold, data migration is performed to move data from the LU 1411 that belongs to this parity group 1410 to another parity group 1410. The LU 1411 that requires a shorter migration time than other LUs 1411 is selected as a migration source from which data is moved. The utilization ratio of the parity group 1410 is thus lowered below the threshold within a reduced time.

Further, this embodiment makes it possible to select as the migration destination the parity group 1410 that does not exceed its utilization ratio threshold after migration.

While the present invention has been described in detail and pictorially in the accompanying drawings, the present invention is not limited to such detail but covers various obvious modifications and equivalent arrangements, which fall within the purview of the appended claims.

What is claimed is:

1. A method of balancing a load in a computer system having at least one storage system coupled to a host computer, and a management computer coupled to the host computer and the at least one storage system, each of the at least one storage system having physical disks, which store data requested by the host computer to be written, and a disk controller, which controls the physical disks, the load balancing method comprising the steps of:

setting, by the disk controller, at least one of the physical disks as a parity group;

providing, by the disk controller, a storage area of the set parity group as at least one logical volume to the host computer;

judging with the management computer, when a utilization ratio of the parity group becomes equal to or larger than a threshold;

judging with the management computer the needs of an online migration for each and every of the at least one logical volume, wherein, for the at least one logical volume where an online migration is necessary, the management computer calculates a logical volume online migration time based on a capacity of the at least one logical volume and an amount of time the host computer is granted access to the at least one logical volume, and wherein, for the at least one logical volume where an online migration is unnecessary, the management computer calculates a logical volume offline migration time based on the capacity of the at least one logical volume, the logical volume offline migration time being a time required to move data from one logical volume in one parity group to another parity group while the host computer access to the at least one logical volume is suspended; and choosing, by the management computer, as a data migration source volume, one of the logical volumes included in the parity group that has the utilization ratio equal to or larger than the threshold, by referring to the calculated logical volume online migration time, the data migration source volume being the logical volume from which data migrates.

2. The load balancing method according to claim 1, wherein, the logical volume choosing step includes choosing, by the management computer, the data migration source logical volume such that the utilization ratio of the parity group that has become equal to or larger than the threshold returns to a utilization ratio lower than the threshold after data migration.

3. The load balancing method according to claim 1, wherein the logical volume choosing step includes choosing, by the management computer, as the data migration source volume, the logical volume that has the shortest online migration time calculated.

4. The load balancing method according to claim 1, further comprising instructing, by the management computer, the relevant storage system to perform migration of data from the chosen data migration source volume.

5. The load balancing method according to claim 1, wherein the logical volume choosing step includes avoiding, by the management computer, choosing of a specific logical volume as the data migration source volume.

6. The load balancing method according to claim 5, wherein the specific logical volume forms a copy pair.

7. The load balancing method according to claim 1, further comprising choosing, by the management computer, a migration destination parity group for data of the chosen data migration source volume such that the utilization ratio of the parity group does not become equal to or larger than a threshold after data migration.

8. A computer system, comprising:
   at least one storage system coupled to a host computer; and
   a management computer coupled to the host computer and the at least one storage system, and having a processor, a memory, and an interface,
   wherein each of the at least one storage system has physical disks, which store data requested by the host computer to be written, and a disk controller, which controls the physical disks,
   wherein the disk controller is configured to:
   set at least one of the physical disks as a parity group;
   provide a storage area of the set parity group as at least one logical volume to the host computer;
   judge when a utilization ratio of the parity group becomes equal to or larger than a threshold;
   judge the needs of an online migration for each and every of the at least one logical volume,
      wherein, for the at least one logical volume where an online migration is necessary, the processor calculates a logical volume online migration time based on a capacity of the at least one logical volume and an amount of time the host computer is granted access to the at least one logical volume, and
      wherein, for the at least one logical volume where an online migration is unnecessary, the processor calculates a logical volume offline migration time based on the capacity of the at least one logical volume, the logical volume offline migration time being a time required to move data from one logical volume in one parity group to another parity group while the host computer access to the at least one logical volume is suspended; and
   choosing, by the management computer, as a data migration source volume, one of the logical volumes included in the parity group that has the utilization ratio equal to or larger than the threshold, by referring to the calculated logical volume online migration time, the data migration source volume being the logical volume from which data migrates.

9. The computer system according to claim 8, wherein the processor chooses the data migration source logical volume such that the utilization ratio of the parity group that has become equal to or larger than the threshold returns to a utilization ratio lower than the threshold after data migration.

10. The computer system according to claim 8, wherein the processor chooses, as the data migration source, the logical volume that has the shortest online migration time calculated.

11. The computer system according to claim 8, wherein the processor instructs the disk controller to perform migration of data from the chosen data migration source volume via the interface.

12. The computer system according to claim 8, wherein the processor avoids choosing of a specific logical volume as the data migration source volume.

13. The computer system according to claim 12, wherein the specific logical volume forms a copy pair.

14. The computer system according to claim 8, wherein the processor chooses a migration destination parity group for data of the chosen data migration source volume such that the utilization ratio of the parity group does not become equal to or larger than a threshold after data migration.

* * * * *